(12) United States Patent
Hirota et al.

(10) Patent No.: US 6,823,897 B2
(45) Date of Patent: Nov. 30, 2004

(54) FOUR-WAY SWITCHING VALVE

(75) Inventors: Hisatoshi Hirota, Hachioji (JP); Toshiyuki Shiota, Hachioji (JP); Katsumi Koyama, Hachioji (JP)

(73) Assignee: TGK Co., Ltd., Tokyo (JP)

(*) Notice: Subject to any disclaimer, the term of this patent is extended or adjusted under 35 U.S.C. 154(b) by 184 days.

(21) Appl. No.: 10/180,851

(22) Filed: Jun. 26, 2002

(65) Prior Publication Data

US 2003/0000586 A1 Jan. 2, 2003

(30) Foreign Application Priority Data

Jul. 2, 2001 (JP) ........................................ 2001-200824
Sep. 5, 2001 (JP) ........................................ 2001-268492

(51) Int. Cl.[7] .............................................. F16K 11/22
(52) U.S. Cl. .................. 137/885; 62/324.6; 137/625.43
(58) Field of Search ........................ 137/596.16, 625.43, 137/885; 62/324.6

(56) References Cited

U.S. PATENT DOCUMENTS 2,638,123 A   5/1953  Vargo
3,175,581 A   3/1965  Brandenberg et al.
4,055,056 A * 10/1977  Perkins ...................... 62/324.6

FOREIGN PATENT DOCUMENTS

FR  2 328 147   5/1977
GB    885778   12/1961

* cited by examiner

Primary Examiner—Gerald A. Michalsky
(74) Attorney, Agent, or Firm—Patterson, Thuente, Skaar & Christensen, P.A.

(57) ABSTRACT

A four-way switching valve free from leakage of a refrigerant is disclosed. The valve includes two three-way switching valves arranged side by side, each having a pressure-regulating chamber, a piston, and a plug coaxially arranged. One of the pressure-regulating chambers selectively communicates with a low-pressure chamber or a high-pressure chamber via a three-way solenoid valve. The other pressure-regulating chamber communicates with another chamber in which the pressure increases or decreases as the pressure within one of the pressure-regulating chambers decreases or increases. As a result, refrigerant leakage is prevented, in turn preventing degradation of the refrigerating power of a system.

8 Claims, 18 Drawing Sheets

FOUR-WAY SWITCHING VALVE

BACKGROUND OF THE INVENTION

(1) Field of the Invention

This invention relates to a four-way switching valve, and more particularly to a four-way switching valve which carries out switching of refrigerant lines when the cooling and heating operation mode is switched in a heat pump-type heating and cooling system for an automotive vehicle.

(2) Description of the Related Art

In a heating and cooling system for an automotive vehicle, a refrigerating cycle is employed when cooling operation is performed, and when heating operation is performed, engine coolant is used as a heat source. Recently, however, due to the improvement in combustion efficiency of the engine, the temperature of the coolant does not rise high enough to obtain sufficient heating temperature in winter. For this reason, there is an increasing need for a system which can perform both cooling and heating. In a heating and cooling system of this kind, it is necessary to reverse the direction of flow of a refrigerant flowing through an internal heat exchanger and an external heat exchanger, as the system is switched between cooling and heating operations. The flow of the refrigerant is switched by a four-way switching valve.

FIG. 18 is a block diagram showing the arrangement of a heating and cooling system using the four-way switching valve.

The heating and cooling system is comprised of a compressor 101, a four-way switching valve 102, an external heat exchanger 103, a decompressor 104, an internal heat exchanger 105, and an accumulator 106. The four-way switching valve 102 includes four ports A to D. The port A of the four-way switching valve 102 is connected to a delivery side of the compressor 101, the port B is connected to the external heat exchanger 103, the port C is connected to the internal heat exchanger 105, and port D is connected to the accumulator 106.

During the cooling operation, the four-way switching valve 102 is switched such that the port A and the port B is communicated with each other and the port C and the port D is communicated with each other, as indicated by solid lines in FIG. 18. Therefore, a high-temperature and high-pressure refrigerant compressed by the compressor 101 is guided into the port A of the four-way switching valve 102, and sent from the port B to the external heat exchanger 103, where the refrigerant is caused to undergo heat exchange and condensed, and then by the decompressor 104, the refrigerant is adiabatically expanded to a low-temperature and low-pressure refrigerant. The internal heat exchanger 105 causes the low-temperature and low-pressure refrigerant to undergo heat exchange with warm air in the vehicle cabin and evaporate. Then, the refrigerant flows through the port C and the port D of the four-way switching valve 102 to enter the accumulator 106, where it is caused to undergo gas/liquid separation, followed by returning to the compressor 101.

On the other hand, during the heating operation, the four-way switching valve 102 is switched such that the port A and the port C communicate with each other and the port B and the port D communicate with each other, as indicated by broken lines in the figure. Therefore, the high-temperature and high-pressure refrigerant compressed by the compressor 101 is sent through the port A and the port C of the four-way switching valve 102, to enter the internal heat exchanger 105, where it is caused to undergo heat exchange with cool air in the vehicle cabin to heat the same. The refrigerant condensed by the internal heat exchanger 105 is adiabatically expanded by the decompressor 104 to the low-temperature and low-pressure refrigerant. Then, the external heat exchanger 103 causes the refrigerant to undergo heat exchange to evaporate, and then the refrigerant is guided through the port B and the port D to flow into the accumulator 106, where it is caused to undergo gas/liquid separation, followed by returning to the compressor 101.

As described above, the four-way-switching valve 102 can switch the operation mode of the heating and cooling system, by changing over the flow path of refrigerant.

As the four-way switching valve 102, there has been proposed a four-way switching valve in Japanese Patent Application No. 2001-183291 filed by the present applicant. The four-way switching valve is configured such that a first valve and a third valve for opening and closing passages from a port A into which a high-pressure refrigerant is introduced, to a port B or a port C, and a second valve and a fourth valve for opening and closing passages from the port B or the port C to a low-pressure port D are made separate and independent. The first valve and the second valve, and the third valve and the fourth valve are driven by a first piston and a second piston, respectively, and at the same time two solenoid valves are provided for selectively guiding part of the high-pressure refrigerant introduced into the port A, to pressure-regulating chambers for the first and second pistons.

This enables the two solenoid valves to guide a high-pressure fluid in the port A into the pressure-regulating chamber for the first piston or that for the second piston in a switching manner, thereby making it possible to switch between a first state in which the port A communicates with the port B, and the port C communicates with the port D, and a second state in which the port A communicates with the port C, and the port B communicates with the port D.

However, although the conventional four-way switching valve is configured such that the high-pressure refrigerant is selectively introduced into one of the respective pressure-regulating chambers for the first and second pistons to thereby drive the first to fourth valves, the pressure of one of the chambers into which the high-pressure refrigerant is not introduced is reduced by leaking it to the low-pressure port D via a corresponding one of respective clearances between the first and second positions and the cylinders for accommodating the pistons, whereby the first or second piston is returned to a switching position thereof in the first or second state. Therefore, the four-way switching valve suffers from the problem that the leakage of refrigerant from the pressure-regulating chambers to the low-pressure port D results in degraded refrigerating power of the heating and cooling system, although the amount of leakage is very small.

SUMMARY OF THE INVENTION

The present invention has been made in view of the above points, and an object thereof is to provide a four-way switching valve free from leakage of refrigerant. To achieve the above object, there is provided a four-way switching valve for switching between a first state in which a fluid introduced into a first port is discharged to a second port and the fluid introduced into a third port is discharged to a fourth port, and a second state in which the fluid introduced into the first port is discharged to the third port and the fluid introduced into the second port is discharged to the fourth port. The four-way switching valve comprising a combination of a first three-way switching valve for carrying out a switching operation to cause the second port to communicate with the first port or the fourth port and a second three-way switching valve for carrying out a switching operation to cause the third port to communicate with the fourth port or the first port.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, an embodiment of the present invention will now be described in detail with reference to drawings. In the embodiment, a four-way switching valve according to the invention is applied to a heat pump-type heating and cooling system for an automotive vehicle, by way of example.

Figure 1:
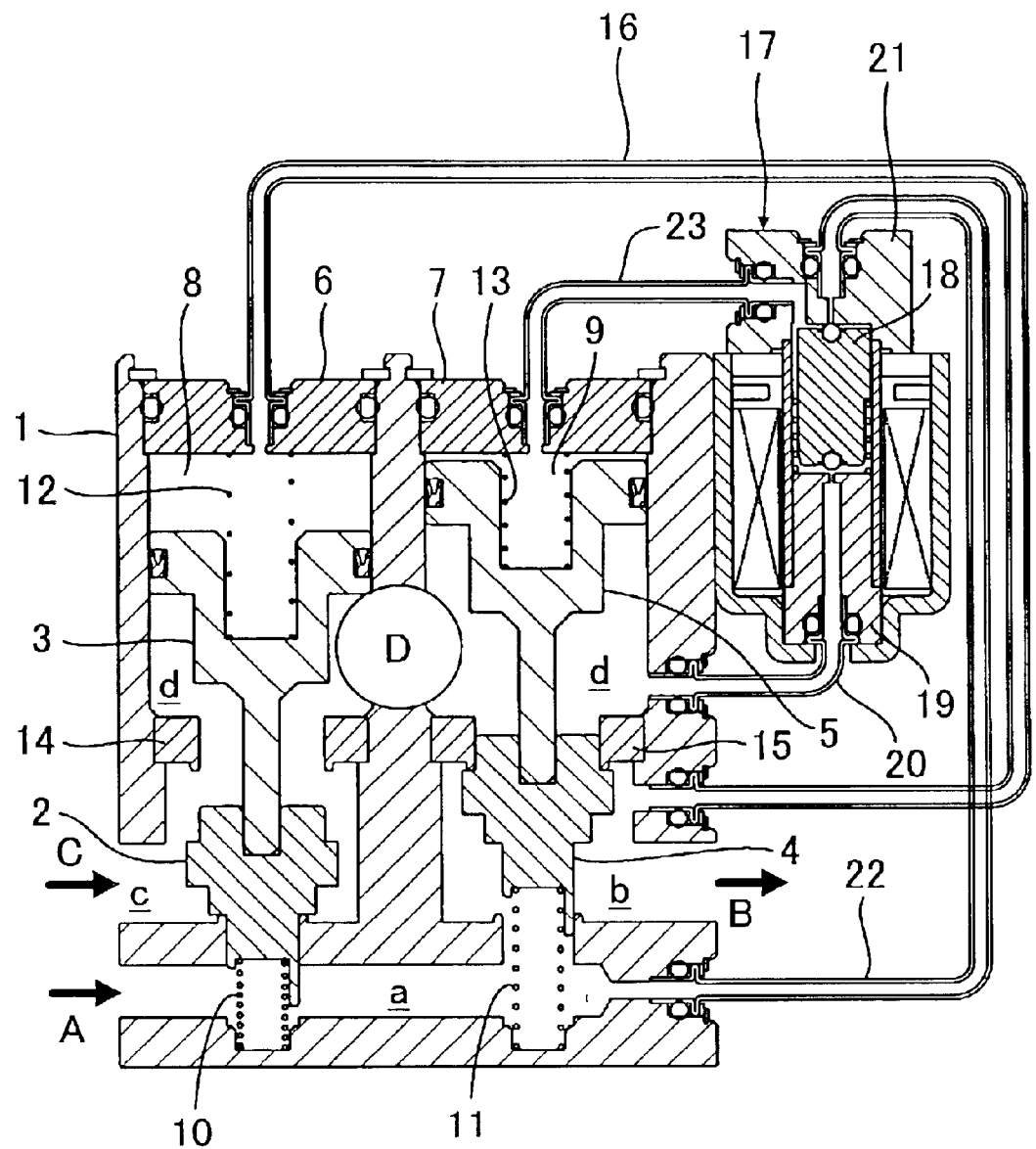
FIG. 1 is a longitudinal sectional view of a four-way switching valve according to a first embodiment of the invention, which shows the four-way switching valve in a solenoid-deenergized state.
Figure 2:
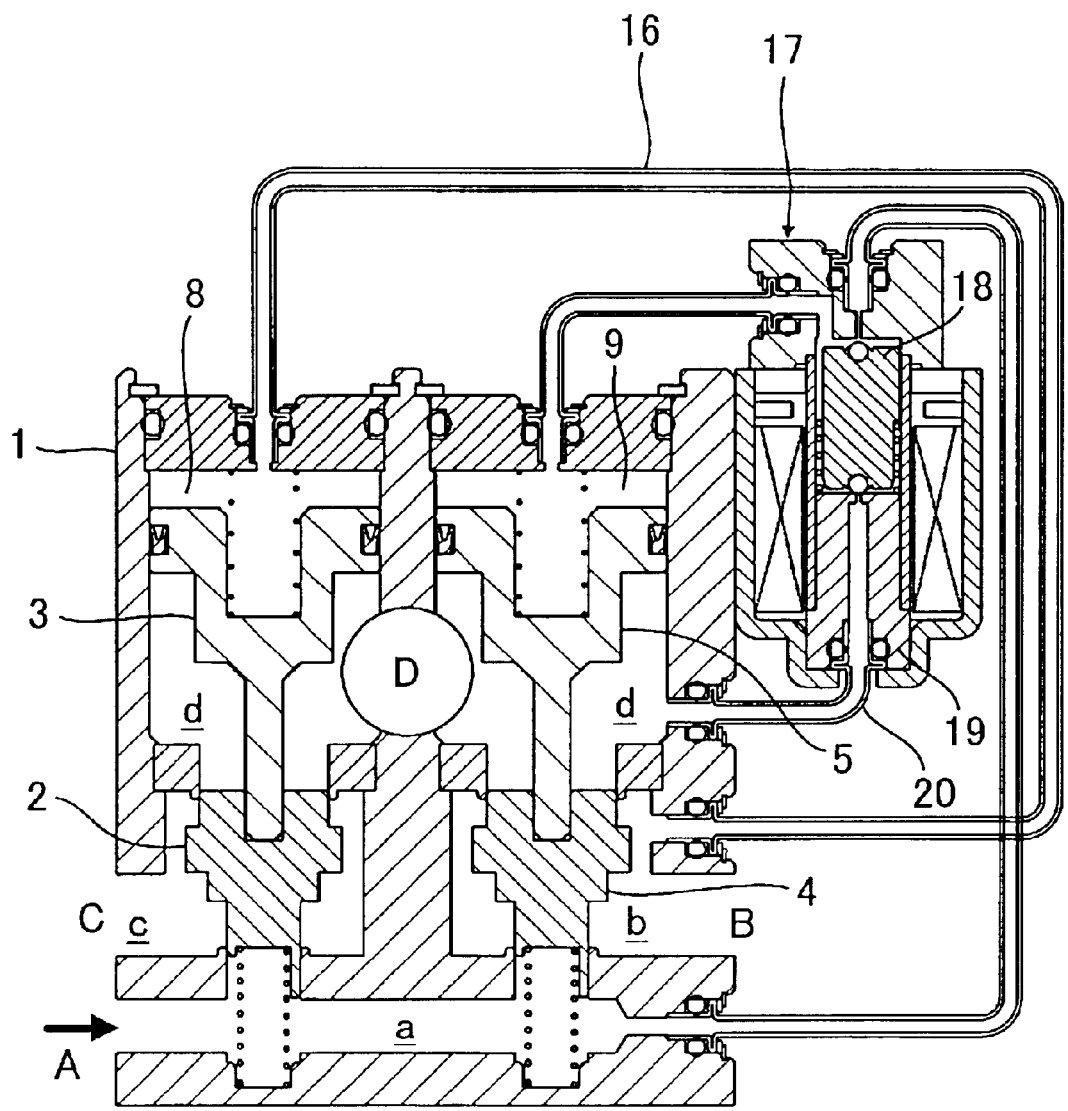
FIG. 2 is a longitudinal sectional view showing the four-way switching valve according to the first embodiment of the invention, which shows the four-way switching valve in an intermediate position in the solenoid-energized state.
Figure 3:
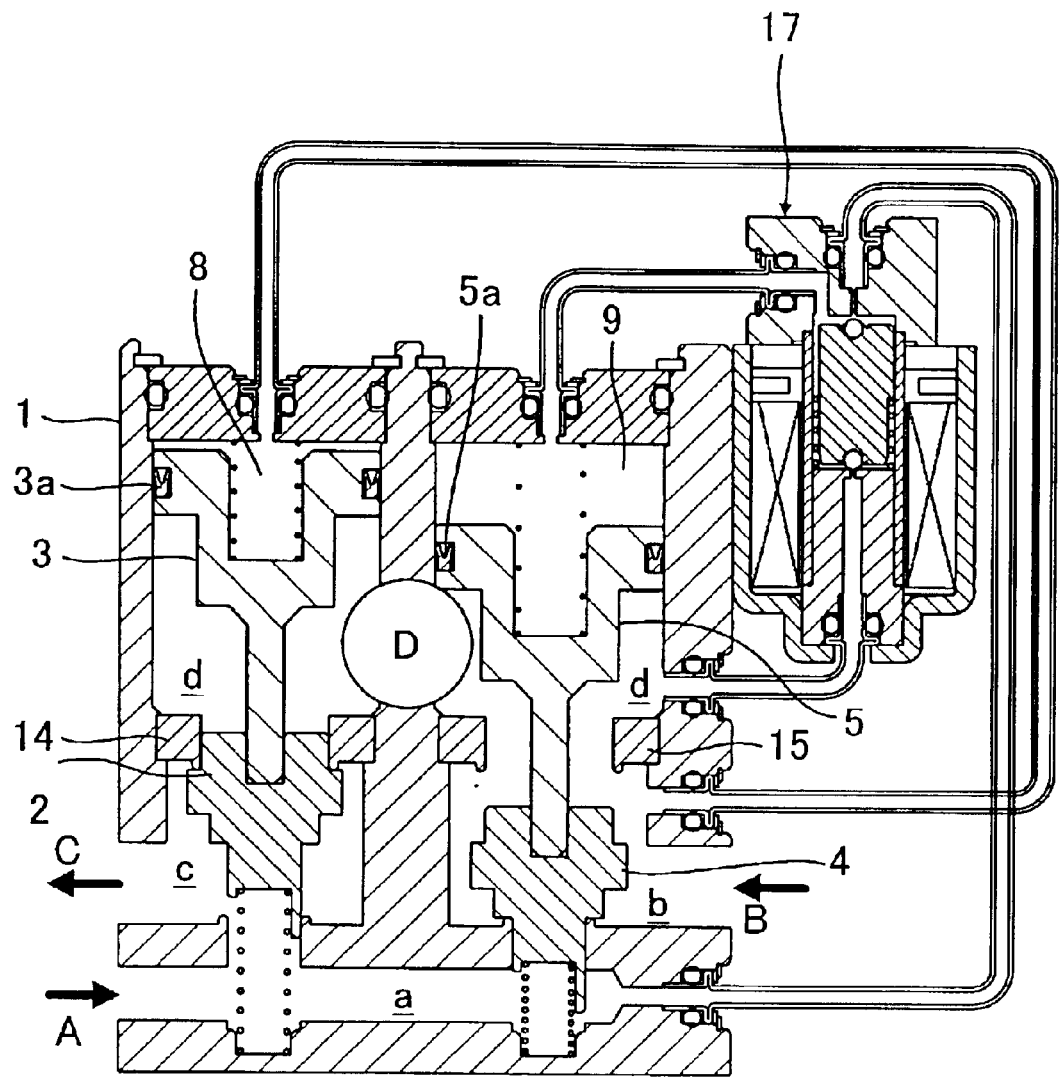
FIG. 3 is a longitudinal sectional view showing the four-way switching valve according to the first embodiment of the invention, which shows the four-way switching valve in a solenoid-energized state.

FIG. 1 is a longitudinal sectional view of the four-way switching valve according to a first embodiment of the invention, which shows the four-way switching valve in a solenoid-deenergized state. FIG. 2 is a longitudinal sectional view of the four-way switching valve according to the first embodiment of the invention, which shows the four-way switching valve in an intermediate position in the solenoid-energized state. FIG. 3 is a longitudinal sectional view of the four-way switching valve according to the first embodiment of the invention, which shows the four-way switching valve to in a solenoid-energized state.

To implement the four-way switching valve, in the heat pump-type heating and cooling system, a port A formed in a body 1 is connected to piping for receiving a high-pressure refrigerant discharged from a compressor, a port B is connected to piping which leads to an external heat exchanger, a port C is connected to piping which leads to an internal heat exchanger, and a port D is connected to low-pressure refrigerant piping which leads to the suction side of the compressor.

The four-way switching valve has the body 1 having two cylinders formed therein. In the two cylinders, a plug 2 and a piston 3, and a plug 4 and a piston 5 are arranged, respectively, in parallel with each other, such that they can reciprocate in a vertical direction as viewed in the figures. Portions of the cylinders above the pistons 3, 5 are closed by caps 6 and 7, respectively, to define pressure-regulating chambers 8 and 9, between the cap 6 and the piston 3, and between the cap 7 and the piston 5, respectively. The pistons 3 and 5 are integrally formed with axially extending shafts whose end portions are fitted in holes formed concavely in the upper surfaces of the plugs 2 and 4, respectively. The plugs 2 and 4 are urged by springs 10 and 11, upward as viewed in the figures, respectively, while the pistons 3 and 5 are urged by springs 12 and 13, downward as viewed in the figures, respectively. This holds the plugs 2, 4 and the pistons 3, 5 in a state pressed against each other.

The plugs 2 and 4 each have portions serving as valve elements arranged on axially opposite sides thereof. Annular projections, which are integrally formed with the body 1 in a manner protruding into chambers c and b communicating with the ports C and B, respectively, form valve seats on which the plugs 2 and 4 are seated when the plugs 2 and 4 move downward as viewed in the figures. Further, annular projections, which are integrally formed with plugs 14 and 15 in a manner protruding into the chambers c and b, form valve seats on which the plugs 2 and 4 are seated when the plugs 2 and 4 move upward as viewed in the figures. The plugs 14 and 15 are rigidly fixed to the body 1 by caulking in the respective cylinders.

As described above, the inside of the body 1 of the four-way switching valve is constructed as a combination of a three-way switching valve that switches to cause the port B to communicate with the port A or the port D, and a three-way switching valve that switches to cause the port C to communicate with the port A or the port D.

The chamber b communicating with the port B is connected to the pressure-regulating chamber 8 via a tube 16 such that the chamber b communicates with the chamber 8. Further, the four-way switching valve includes a three-way solenoid valve 17 for causing the pressure-regulating chamber 9 to selectively communicate with either a chamber a into which a high-pressure refrigerant is introduced or a chamber d communicating with the low-pressure port D.

The three-way solenoid valve 17 includes a plunger 18 which has balls, serving as valve elements, fixed to axially opposite ends thereof, and a core 19 which has a passage formed therethrough along an axis thereof and a valve seat formed at a position opposed to one of the balls fixed to the plunger 18. The passage formed though the core 19 is connected to the low-pressure chamber d by a tube 20 such that it communicates with the chamber d. Arranged outside the plunger 18 on the opposite side of the core 19 is a casing 21 which has a valve seat formed in an inner wall thereof opposed to the other of the balls fixed to the plunger 18 on a side remote from the core 19. The valve seat has a valve hole connected to the high-pressure chamber a by a tube 22 such that the valve hole communicates with the chamber a. Further, the plunger 18 is urged by a spring in a direction away from the core 19, that is, in a direction in which the ball is seated on the valve seat of the casing 21. The plunger 18 has a periphery formed with a plurality of axially-extending communication grooves which allow the opposite end sides of the plunger 18, having the respective balls fixed thereto, to communicate with each other. The space allowing communicating between the above opposite end face sides is communicated with the pressure-regulating chamber 9 via the casing 21 and a tube 23.

In the four-way switching valve constructed as above, as shown in FIG. 1, when the three-way solenoid valve 17 is in a deenergized state, i.e. in the solenoid-deenergized state, the plunger 18 of the three-way solenoid valve 17 is urged by the spring, whereby a passage connected to the tube 22 is blocked while the tube 20 and the tube 23 communicate with each other.

At this time, the pressure within the pressure-regulating chamber 9 is reduced since the chamber 9 is communicating with the chamber d communicating with the low-pressure port D, via the three-way solenoid valve 17. On the other hand, the port A is supplied with the high-pressure refrigerant, so that the plug 4 and the piston 5 are pressed and moved upward as viewed in the figures, and the plug 4 is seated on the annular projection of the plug 15 and is away from the annular projection of the body 1. While this increases the pressure within the chamber b, the pressure within the pressure-regulating chamber 8 is also made as high as that within the chamber b due to simultaneous supply of the high pressure via the tube 16. The piston 3 having a larger pressure-receiving area than that of the plug 2 is pressed and moved downward as viewed in the figures, to cause the plug 2 to be seated on the annular projection of the body 1 and be away from the annular projection of the plug 14. As a result, the port A communicates with the port B, and the port C communicates with the port D. In other words, the heating and cooling system for an automotive vehicle is placed in a cooling operation mode in which the high-pressure refrigerant discharged from the compressor and received via the port A is allowed to flow from the port B to the external heat exchanger, and the refrigerant discharged from the internal heat exchanger and received at the port C is allowed to flow from the port D to the compressor.

Next, as shown in FIG. 2, immediately after entering a solenoid-energized state of the three-way solenoid valve 17, the plunger 18 of the three-way solenoid valve 17 is attracted to the core 19, so that the valve 17 blocks the tube 20 communicating with the chamber d and causes the high-pressure chamber a and the pressure-regulating chamber 9 to communicate with each other. As a result, the high-pressure refrigerant in the chamber a is introduced into the pressure-regulating chamber 9 by way of the three-way solenoid valve 17, whereby the piston 5 is pressed and moved downward as viewed in the figures. At the same time, the plug 4 as well is pressed and moved downward to be inserted into a valve hole communicating with the high-pressure chamber a, so that it becomes difficult for the high-pressure refrigerant to flow from the chamber a to the chamber b to thereby reduce the pressure in the chamber b. As the pressure in the chamber b is reduced, the pressure in the pressure-regulating chamber 8 is also reduced by reduced supply of the high pressure refrigerant via the tube 16, so that the plug 2 and the piston 3 are pressed and moved upward as viewed in the figures, by the high-pressure refrigerant in the chamber a.

The axially opposite end portions of each of the plugs 2 and 4 form guides which are slidably fitted or inserted into respective valve holes associated therewith to guide the axial movements of the plugs 2 and 4. The guides on the axially opposite ends of the respective plugs 2, 4 are formed to have respective lengths large enough to prevent the both of the respective guides of the plugs 2, 4 from being simultaneously drawn out from the associated valve holes by the axial movements of the plugs 2 and 4. Therefore, when the above switching operation is carried out by the three-way solenoid valve 17, one of the valve holes arranged opposed to the plug 2 or 4 is switched from a closed state to an open state thereof whereas the other of the valve holes is switched from an open state to a closed state thereof. When the plugs 2 and 4 are located at respective intermediate positions shown in FIG. 2, both of the valve holes are closed at the same time, and when the respective plugs 2 and 4 are located at positions other than the intermediate positions, one of the opposite valve holes is necessarily closed. Therefore, the high-pressure refrigerant in the chamber a is inhibited from directly flowing out into the low-pressure chamber d.

Then, the plug 4 and the piston 5 are pressed and moved downward as viewed in the figures until the plug 4 is seated on the annular projection of the body 1, while the plug 2 and the piston 3 are pressed and moved upward as viewed in the figure until the plug 2 is seated on the annular projection of the plug 14. In the resulting state shown in FIG. 3, the port A communicates with the port C, and the port B communicates with the port D. That is, the heating and cooling system for an automotive vehicle is switched to a heating operation mode in which the high-pressure refrigerant delivered from the compressor and received via the port A is allowed to flow from the port C to the internal heat exchanger, and the refrigerant discharged from the external heat exchanger and received via the port B is allowed to flow from the port D to the compressor.

As described hereinabove, as the operation mode is switched, the three-way solenoid valve 17 introduces the high-pressure refrigerant into the pressure-regulating chamber 8 or 9, and allows the refrigerant from the pressure-regulating chamber 8 or 9 to flow into the low-pressure chamber d, whereby it is possible to dispense with a mechanism which always causes the refrigerant to leak from the pistons 3, 5 to reduce pressure in the pressure-regulating chambers 8 and 9. On the contrary, the pistons 3 and 5 separate the chamber d from the pressure-regulating chambers 8 and 9a by respective sealing members, such as "V" gaskets 3a and 5a.

Figure 4:
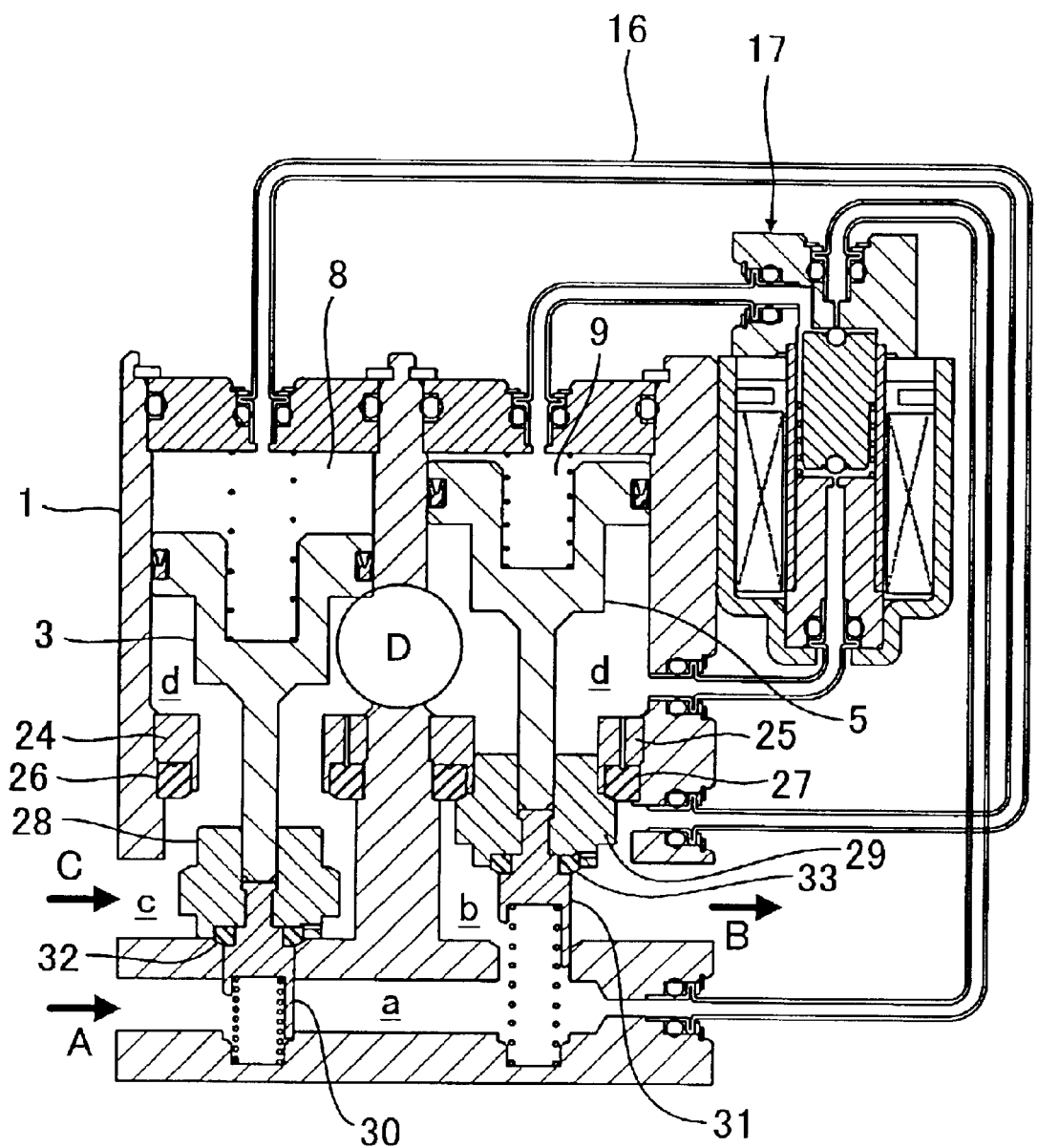
FIG. 4 is a longitudinal sectional view of a four-way switching valve according to a second embodiment of the invention, which shows the four-way switching valve in a solenoid-deenergized state.
Figure 5:
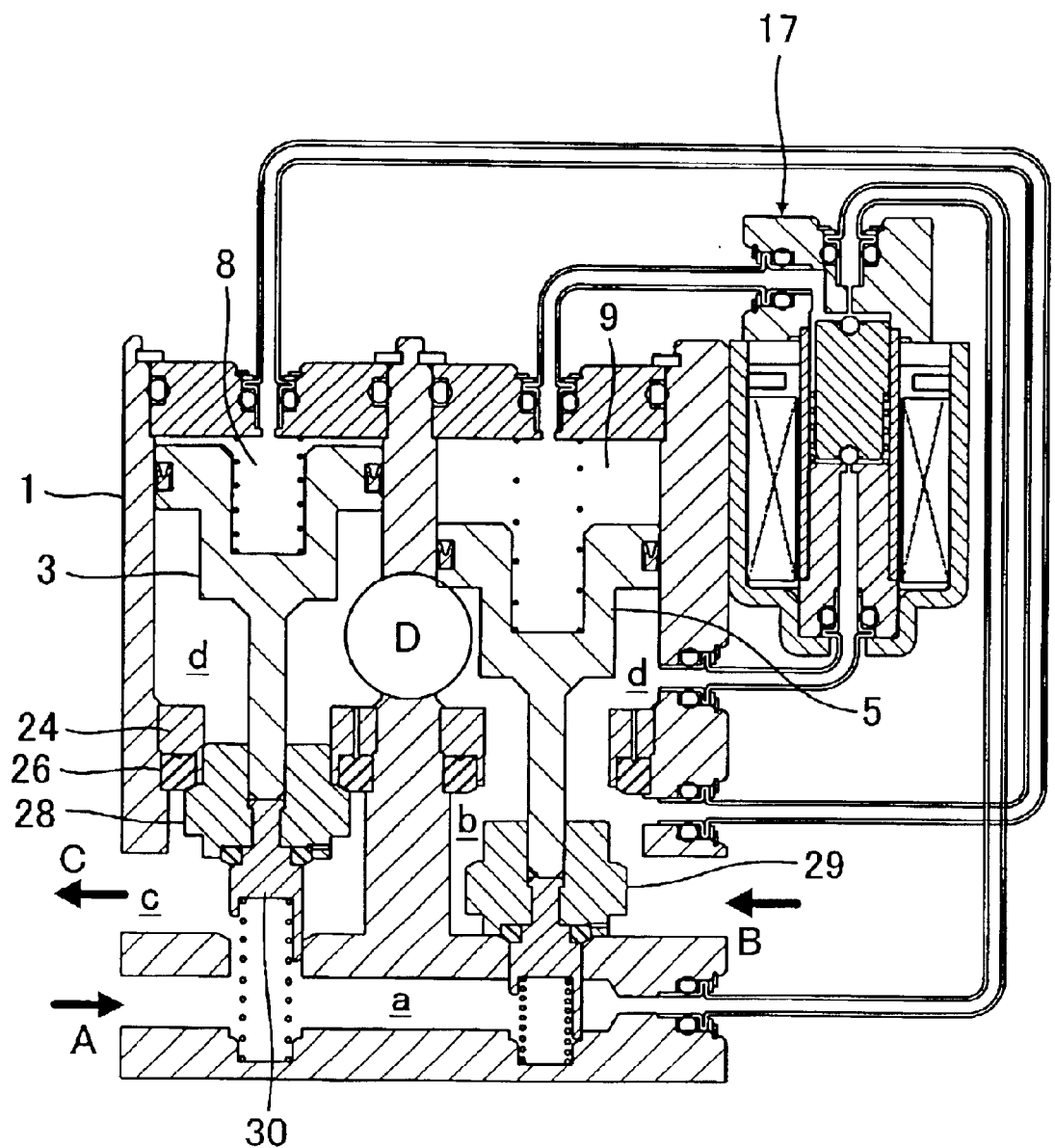
FIG. 5 is a longitudinal sectional view showing the four-way switching valve according to second embodiment of the invention, which shows the four-way switching valve in a solenoid-energized state.

FIG. 4 is a longitudinal sectional view of a four-way switching valve according to a second embodiment of the invention, which shows the four-way switching valve in a solenoid-deenergized state. FIG. 5 is a longitudinal sectional view of the four-way switching valve according to the second embodiment of the invention, which shows the four-way switching valve in a solenoid-energized state. It should be noted that in FIGS. 4 and 5, component parts and elements similar or equivalent to those of the four-way switching valve shown in FIG. 1 are designated by identical reference numerals, and detailed description thereof is omitted.

The four-way switching valve according to the second embodiment is improved in the sealing performance of a valve portion in comparison with the four-way switching valve according to the first embodiment. More specifically, stoppers 24 and 25 are fixed to respective intermediate portions of two cylinders formed in the body 1. The stoppers 24 and 25 have annular plug discs 26 and 27 fitted on the respective sides thereof toward the chambers c and b. The plug discs 26 and 27 are formed by using flexible materials, such as rubber and polytetrafluoroethylene. Arranged opposed to the respective plug discs 26 and 27 are plugs 28 and 29 such that the plugs 28 and 29 can axially move into contact with and away from the plug discs 26 and 27, respectively. The plugs 28 and 29 have respective center openings formed in upper portions thereof as viewed in the figures, for having the shafts of the pistons 3 and 5 fitted therein, and have guides 30 and 31 rigidly fixed thereto at lower portions thereof as viewed in the figures. The guides 30 and 31 are arranged in a manner slidably inserted into valve holes formed to connect between the chambers a and c, and between the chambers a and b, respectively. Further, between the plug 28 and the guide 30, and between the plug 29 and the guide 31 are fitted annular plug discs 32 and 33, respectively. The plug discs 32 and 33 are formed by using flexible materials, such as rubber and polytetrafluoroethylene.

In the four-way switching valve constructed as above, in the solenoid-deenergized state, as shown in FIG. 4, the three-way solenoid valve 17 causes the pressure-regulating chamber 9 to communicate with the low-pressure chamber d, and the pressure-regulating chamber 8 to communicate with the chamber b via the tube 16. This allows the high-pressure refrigerant in the chamber a to press and move the guide 31 upward as viewed in the figures, so that the plug 29 is pressed against the plug disc 27 to establish a valve-closed state. The high-pressure refrigerant in the chamber a flows into the chamber b to increase the pressure in the pressure-regulating chamber 8, whereby the plug 28 is pressed and moved downward as viewed in the figure, by the piston 3. This causes the plug disc 32 to be pressed against the upper periphery of the valve hole to establish a valve-closed state.

As a result, the port A communicates with the port B, and the port C communicates with the port D, whereby the heating and cooling system for an automotive vehicle is placed in the cooling operation mode.

Next, in the solenoid-energized state, as shown in FIG. 5, the three-way solenoid valve 17 causes the high-pressure chamber a and the pressure-regulating chamber 9 to communicate with each other. This allows the high-pressure refrigerant in the chamber a to be introduced into the pressure-regulating chamber 9 via the three-way solenoid valve 17. Hence, the piston 5 is pressed and moved downward as viewed in the figures, and the plug 29 as well is pressed and moved downward to close the valve hole communicating between the chamber a and the chamber b to establish a valve-closed state. Thus, the chamber b and the low-pressure chamber d communicate with each other, and the pressure-regulating chamber 8 as well communicates with the chamber b, the pressure within which is reduced, so that the guide 30 is pressed and moved upward as viewed in the figures, by the high-pressure refrigerant in the chamber a until the plug 28 is pressed against the plug disc 26 to establish a valve-closed state.

As a result, the port A communicates with the port C, and the port B communicate with the port D, whereby the heating and cooling system for an automotive vehicle is switched to the heating operation mode.

Figure 6:
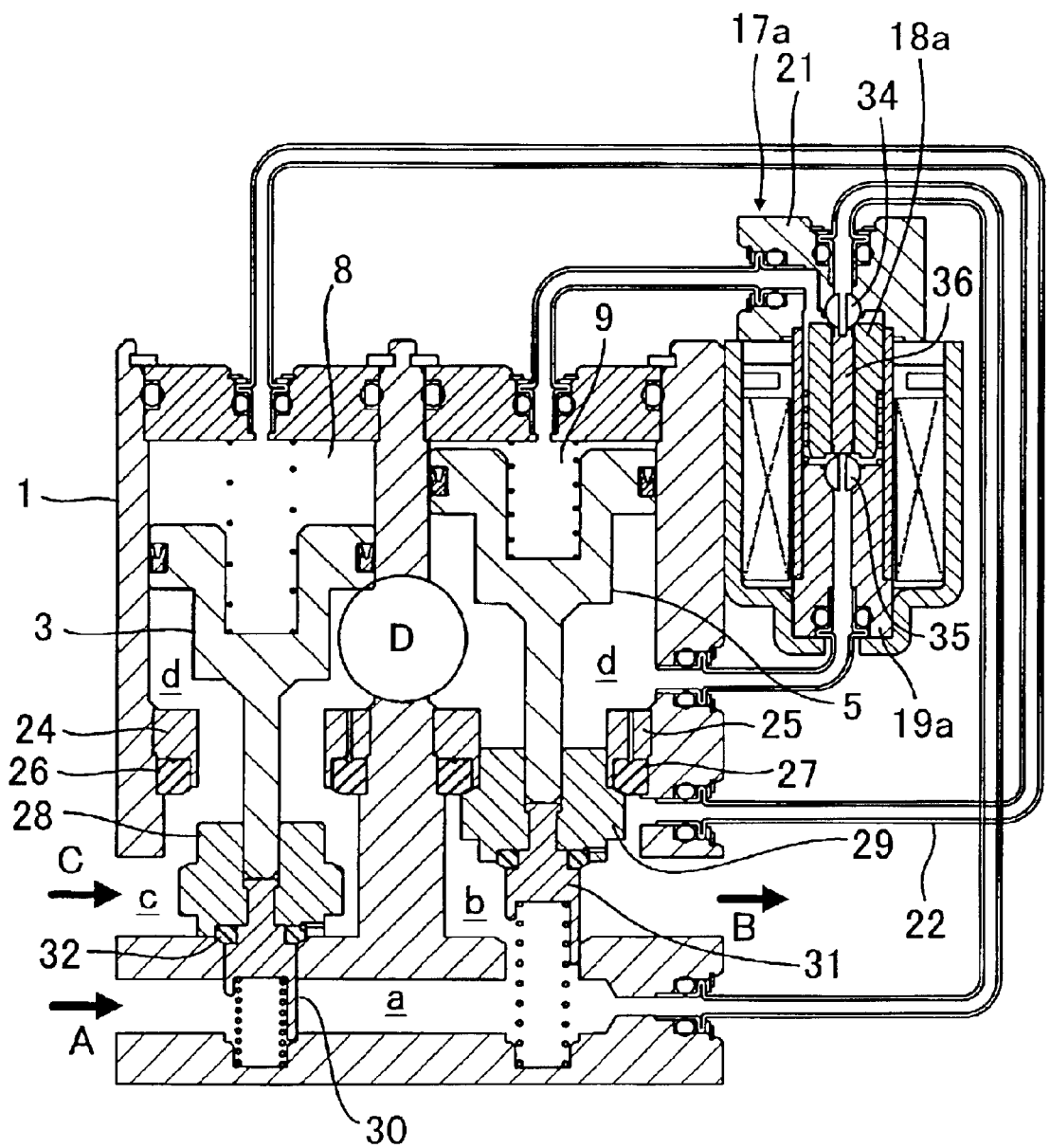
FIG. 6 is a longitudinal sectional view of a four-way switching valve according to a third embodiment of the invention, which shows the four-way switching valve in a solenoid-deenergized state.
Figure 7:
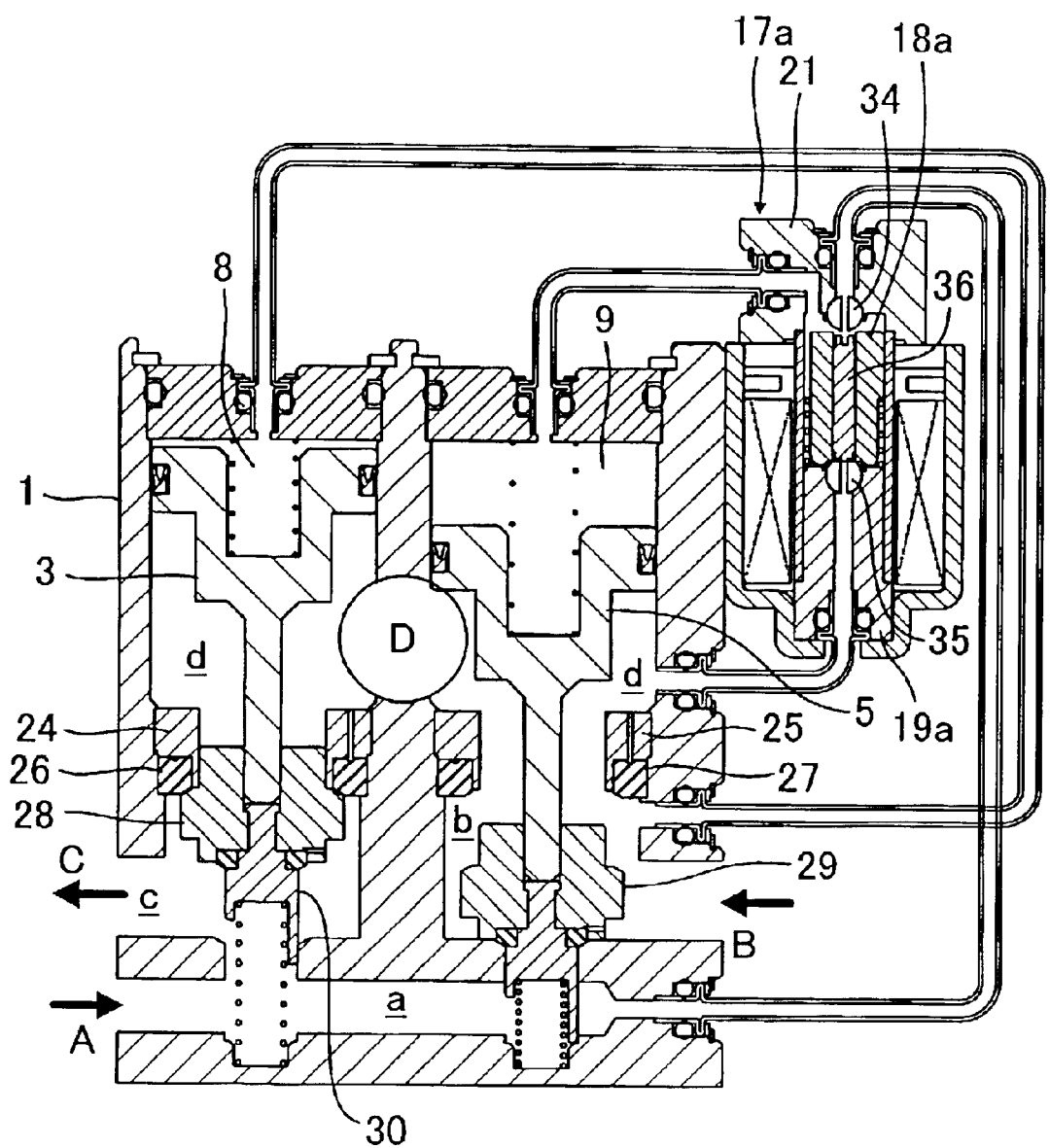
FIG. 7 is a longitudinal sectional view showing the four-way switching valve according to the third embodiment of the invention, which shows the four-way switching valve in a solenoid-energized state.

FIG. 6 is a longitudinal sectional view of a four-way switching valve according to a third embodiment of the invention, which shows the four-way switching valve in a solenoid-deenergized state. FIG. 7 is a longitudinal sectional view of the four-way switching valve according to the third embodiment of the invention, which shows the four-way switching valve in a solenoid-energized state. It should be noted that in FIGS. 6 and 7, component parts and elements similar or equivalent to those of the four-way switching valve shown in FIG. 4 are designated by identical reference numerals, and detailed description thereof is omitted.

The four-way switching valve according to the third embodiment employs a three-way solenoid valve 17a having a different configuration from that of the four-way switching valve according to the second embodiment. In the three-way solenoid valve 17a, ball valve seats 34 and 35 having respective valve holes axially formed therethrough are fixed to a plunger-side end face of a passage formed through the casing 21, and a plunger-side end face of a passage formed through a core 19a, respectively. Between the ball valve seats 34 and 35, a plunger 18a is arranged in a manner axially movably inserted. The plunger 18a has a hollow cylindrical shape which has a center opening formed along a central axis thereof, and a shaft 36 is inserted into the center opening in an axially movable manner. The shaft 36 has opposite end portions reduced in diameter such that an annular space is formed between each of the opposite end portions and the center opening of the plunger 18a. Further, the opposite end portions have end faces formed with grooves extending through the centers thereof such that the annular openings communicate with the valve holes of the ball valve seats 34 and 35 via the grooves, respectively.

Therefore, when the plunger 18a is urged toward the ball valve seat 34 or 35, the center opening at one of the opposite end faces of the plunger 18a is brought into intimate contact with a spherical valve seat surface of the ball valve seat 34 or 35 to establish a valve-closed state. At this time, the other of the opposite end faces of the plunger 18a is moved away from the valve seat surface of the ball valve seat 34 or 35 to establish a valve-opened state.

In the four-way switching valve constructed as above, in the solenoid-deenergized state, as shown in FIG. 6, the plunger 18a of the three-way solenoid valve 17 is urged by the spring to be seated on the ball valve seat 34, whereby the passage connected to the tube 22 is blocked to cause the pressure-regulating chamber 9 to communicate with the low-pressure chamber d via the three-way solenoid valve 17a.

As a result, the guide 31 is pressed and moved upward as viewed in the figures, by the high-pressure refrigerant in the chamber a, and the plug 29 is pressed against the plug disc 27 to establish a valve-closed state. The high-pressure refrigerant in the chamber a flows into the chamber b, whereby the pressure is introduced from the chamber b to the pressure-regulating chamber 8 to cause the piston 3 to press and move the plug 28 downward as viewed in the figures until the plug disc 32 is pressed against the upper periphery of the valve hole, thereby establishing a valve-closed state.

As a result, the port A communicates with the port B, and the port C communicates with the port D, whereby the heating and cooling system for an automotive vehicle is switched to the cooling operation mode.

Next, in the solenoid-energized state, as shown in FIG. 7, the plunger 18a is attracted by the core 19a, so that the three-way solenoid valve 17a blocks the passage for communication with the chamber d and causes the high-pressure chamber a and the pressure-regulating chamber 9 to communicate with each other. This allows the high-pressure refrigerant in the chamber a to be introduced into the pressure-regulating chamber 9 to press and move the piston 5 downward as viewed in the figures, so that the plug 29 is pressed and moved downward to close the valve hole communicating between the chamber a and the chamber b. This causes the chamber b and the low-pressure chamber d to be communicated with each other, and the pressure-regulating chamber 8 as well communicates with the chamber b the pressure within which is reduced, so that the guide 30 is pressed and moved upward as viewed in the figures, by the high-pressure refrigerant in the chamber a, until the plug 28 is pressed against the plug disc 26 to establish a valve-closed state.

As a result, the port A communicates with the port C, and the port B communicates with the port D, whereby the heating and cooling system for an automotive vehicle is switched to the heating operation mode.

Figure 8:
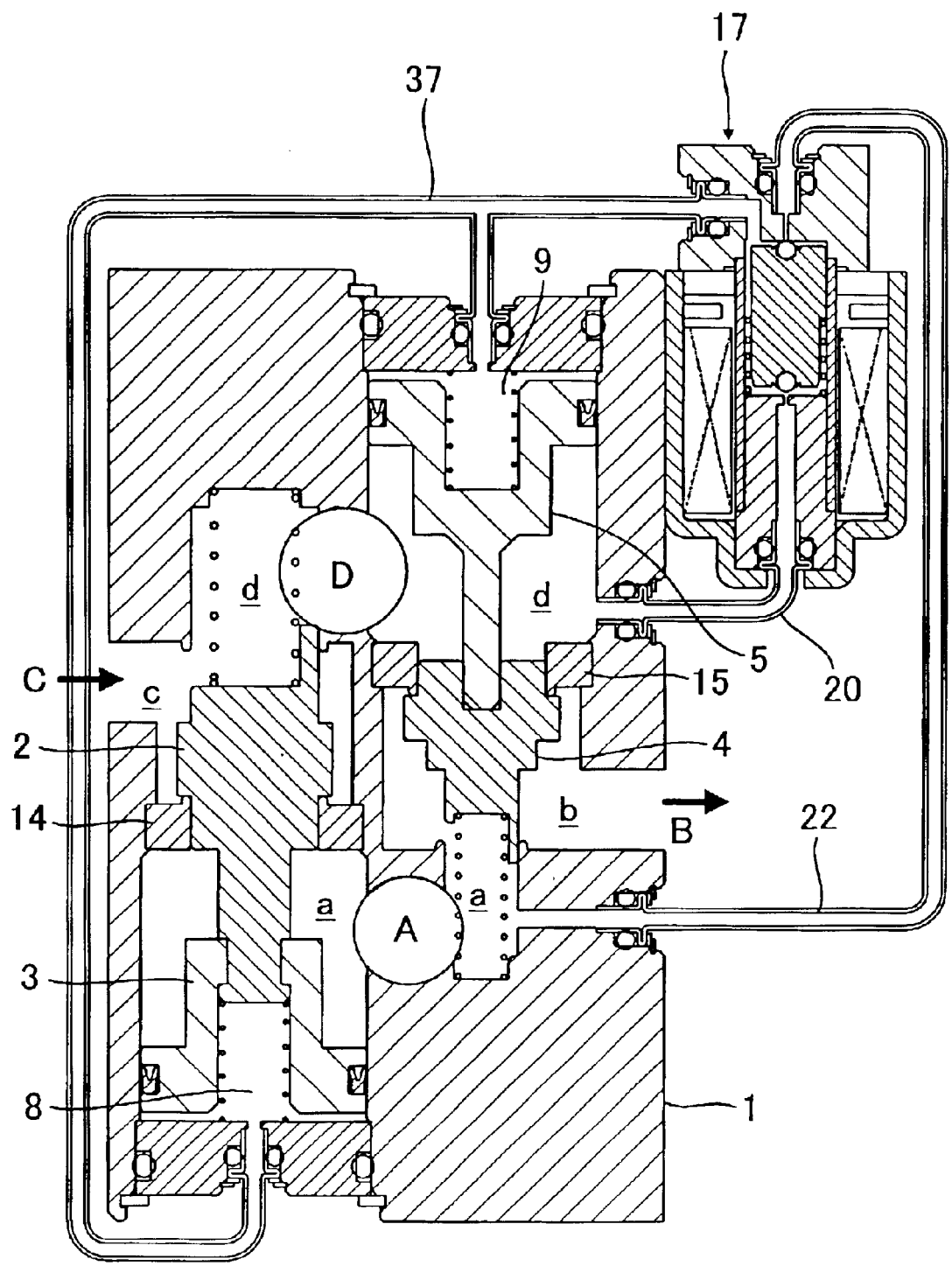
FIG. 8 is a longitudinal sectional view of a four-way switching valve according to a fourth embodiment of the invention, which shows the four-way switching valve in a solenoid-deenergized state.
Figure 9:
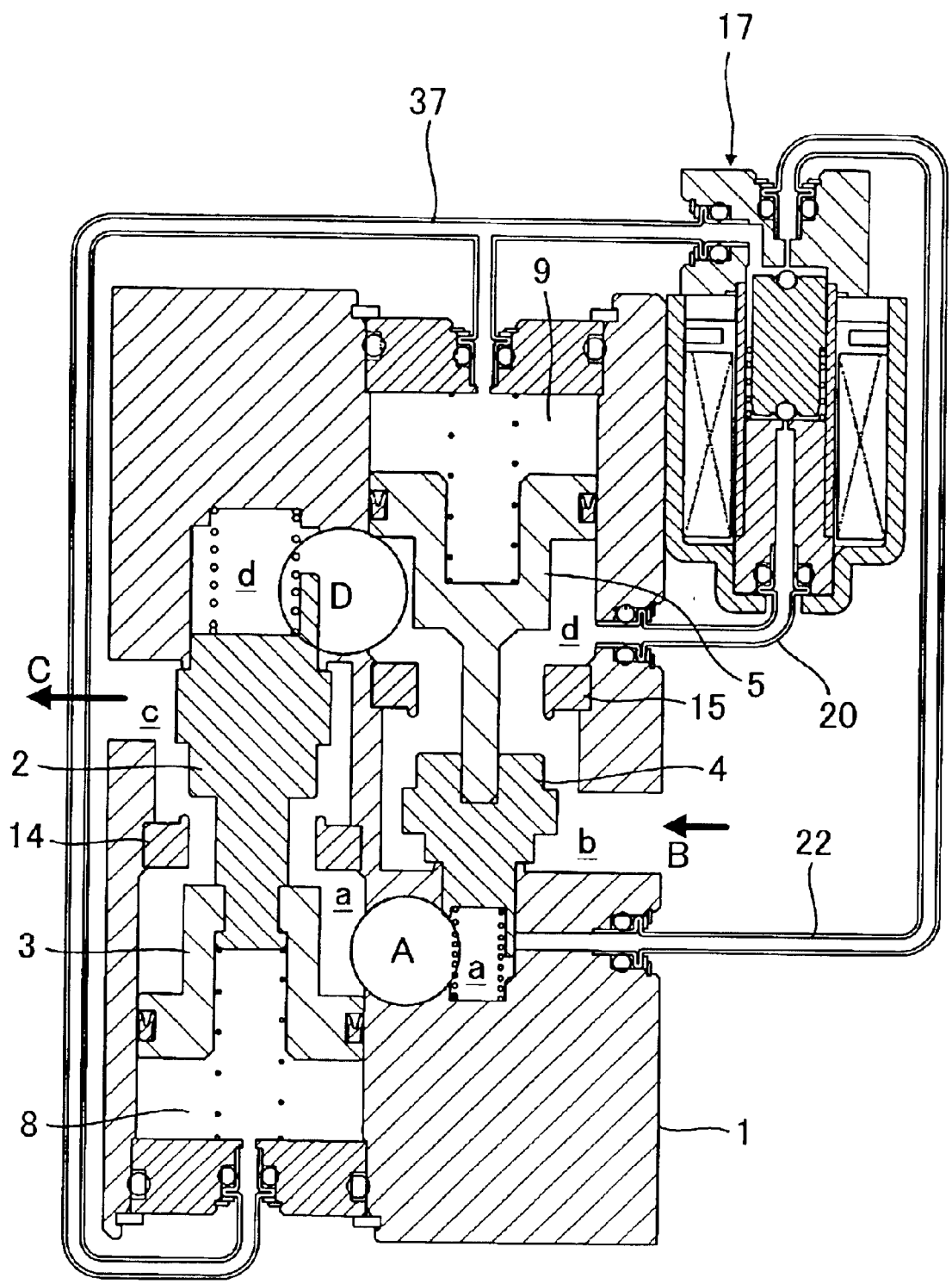
FIG. 9 is a longitudinal sectional view showing the four-way switching valve according to the fourth embodiment of the invention, which shows the four-way switching valve in a solenoid-energized state.

FIG. 8 is a longitudinal sectional view of a four-way switching valve according to a fourth embodiment of the invention, which shows the four-way switching valve in a solenoid-deenergized state. FIG. 9 is a longitudinal sectional view of the four-way switching 2 valve according to the fourth embodiment of the invention, which shows the four-way switching valve in a solenoid-energized state. It should be noted that in FIGS. 8 and 9, component parts and elements similar or equivalent to those of the four-way switching valve shown in FIG. 1 are designated by identical reference numerals, and detailed description thereof is omitted.

In the four-way switching valve according to the fourth embodiment, the arrangement of a plug, a piston, and a pressure-regulating chamber in the left-hand side sequence and that of a plug, a piston, and a pressure-regulating chamber in the right-hand side sequence are made reverse to each other. Further, the four-way switching valve is configured such that the pressure of refrigerant switched by the three-way solenoid valve 17 is simultaneously introduced into the pressure-regulating chamber in each sequence, to thereby dispense with the tube connected to the chamber b.

More specifically, in the four-way switching valve according to the fourth embodiment, the plug 2, the piston 3, and the pressure-regulating chamber 8 in the left-hand side sequence are arranged in this order from above as viewed in the figures, whereas the plug 4, the piston 5, and the pressure-regulating chamber 9 in the right-hand side sequence are arranged in this order from below as viewed in the figures. Further, in the configuration of the left-hand side sequence as viewed in the figures, the plug 2 and the piston 3 are joined to each other since they act in a manner pulling each other. Although the three-way solenoid valve 17 is similar to the above-mentioned embodiments in respect of piping to the high-pressure chamber a by the tube 22 and piping to the low-pressure chamber d by the tube 20, the other piping is formed by connecting a bifurcated tube 37 to the pressure-regulating chambers 8 and 9.

In the four-way switching valve configured as above, in the solenoid-deenergized state, as shown in FIG. 8, the three-way solenoid valve 17 closes the tube 22 connected to the high-pressure chamber a and cause the pressure-regulating chambers 8 and 9 to communicate with the low-pressure chamber d.

As a result, since the pressure within the pressure-regulating chamber 9 is reduced, and the high-pressure refrigerant is supplied to the port A, the plug 4 and the piston 5 are pressed and moved upward as viewed in the figures to cause the plug 4 to be seated on the annular projection of the plug 15 and moved away from the annular projection of the body 1. Further, since the pressure within the pressure-regulating chamber 8 is reduced, and a chamber on the side of the piston 3 opposite to the pressure-regulating chamber 8 is communicated with the port A, the piston 3 is pressed and moved downward as viewed in the figures, and at the same time the plug 2 coupled to the piston 3 is pulled and moved downward, to cause the plug 2 to be seated on the annular projection of the plug 14 and moved away from the annular projection of the body 1. As a result, the port A communicates with the port B, and the port C communicates with the port D, whereby the heating and cooling system for an automotive vehicle is switched to the cooling operation mode.

Next, in the solenoid-energized state, as shown in FIG. 9, the three-way solenoid valve 17 blocks the tube 20 communicating with the chamber d and causes the high-pressure chamber a to communicate with the pressure-regulating chambers 8 and 9. This causes the piston 5 to be pressed and moved downward as viewed in the figures, and the plug 4 to be seated on the annular projection of the body 1 and moved away from the annular projection of the plug 15. Simultaneously, the piston 3 is pressed and moved upward as viewed in the figures to cause the plug 2 to be seated on the annular projection of the body 1 and moved away from the annular projection of the plug 14. As a result, the port A communicates with the port C, and the port B communicates with the port D, whereby the heating and cooling system for an automotive vehicle is switched to the heating operation mode.

Figure 10:
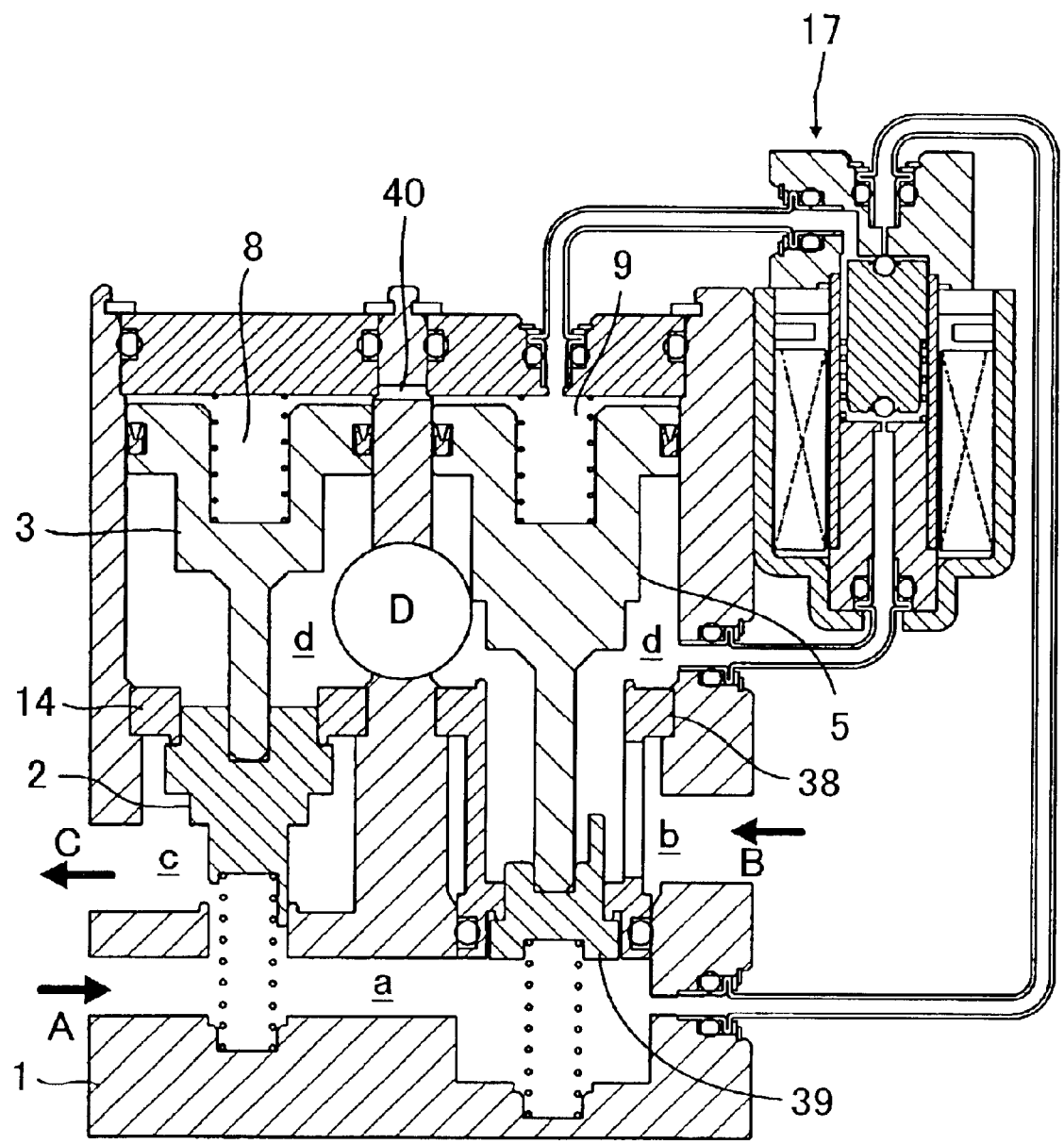
FIG. 10 is a longitudinal sectional view of a four-way switching valve according to a fifth embodiment of the invention, which shows the four-way switching valve in a solenoid-deenergized state.
Figure 11:
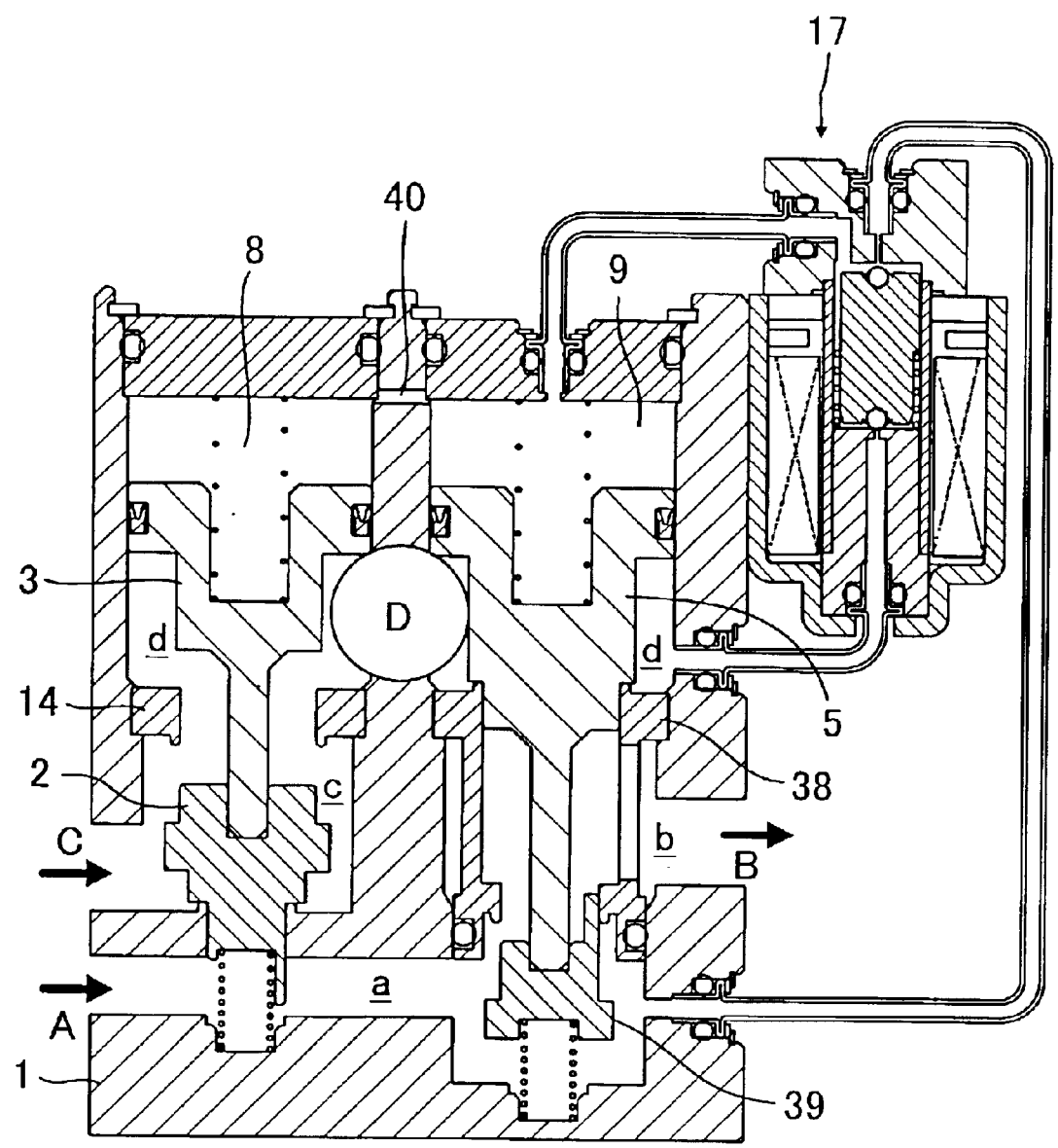
FIG. 11 is a longitudinal sectional view showing the four-way switching valve according to the fifth embodiment of the invention, which shows the four-way switching valve in a solenoid-energized state.

FIG. 10 is a longitudinal sectional view of a four-way switching valve according to a fifth embodiment of the invention, which shows the four-way switching valve in a solenoid-deenergized state. FIG. 11 is a longitudinal sectional view of the four-way switching valve according to the fifth embodiment of the invention, which shows the four-way switching valve in a solenoid-energized state. It should be noted that in FIGS. 10 and 11, component parts and elements similar or equivalent to those of the four-way switching valve shown in FIG. 1 are designated by identical reference numerals, and detailed description thereof is omitted.

Although in each of the above-mentioned embodiments, the four-way switching valve causes the plug arranged in the chamber b to serve as a valve element, in the four-way switching valve according to the fifth embodiment, a stopper 38 is arranged which has valve seats each in the form of an annular projection arranged on axially opposite sides thereof, and the piston 5 and a plug 39 which is arranged in the high-pressure chamber a form a valve element. Further, the respective pressure-regulating chambers 8 and 9 for the pistons 3 and 5 communicate with each other by a passage 40 formed in the body 1. In the illustrated example, the pressure-regulating chamber 9 is configured such that it can communicate with the high-pressure chamber a or the low-pressure chamber d via the three-way solenoid valve 17.

In the four-way switching valve constructed as above, in the solenoid-deenergized state, as shown in FIG. 10, the three-way solenoid valve 17 causes the pressure-regulating chambers 8 and 9 to communicate with the low-pressure chamber d. In this state, since the pressure within the pressure-regulating chamber 9 is reduced whereas the pressure within the chamber a is increased, the plug 39 and the piston 5 are pressed and moved upward as viewed in the figures so that the plug 39 is seated on the valve seat formed by the annular projection on the lower end face of the stopper 38 as viewed in the figures, with the piston 5 being moved away from the valve seat formed by the annular projection formed on the upper end face of the stopper 38 as viewed in the figures. Further, since the pressure within the pressure-regulating chamber 8 is reduced, and the pressure within the chamber a is increased, the plug 2 and the piston 3 are pressed and moved upward as viewed in the figures so that the plug 2 is seated on the annular projection of the plug 14 and moved away from the annular projection of the body 1. As a result, the port A communicates with the port C, and the port B communicates with the port D, whereby the heating and cooling system for an automotive vehicle is switched to the heating operation mode.

Next, in the solenoid-energized state, as shown in FIG. 11, the three-way solenoid valve 17 causes the high-pressure chamber a to be communicated with the pressure-regulating chambers 8 and 9. This causes the piston 5 to be pressed and moved downward as viewed in the figures, and seated on the annular projection formed on the upper end face of the stopper 38, and the plug 39 to be moved away from the annular projection formed on the lower end face of the stopper 38. At the same time, the piston 3 is pressed and moved downward as viewed in the figures, and the plug 2 is moved away from the annular projection of the plug 14 and seated on the annular projection of the body 1. As a result, the port A communicates with the port B, and the port C communicates with the port D, whereby the heating and cooling system for an automotive vehicle is switched to the cooling operation mode.

Figure 12:
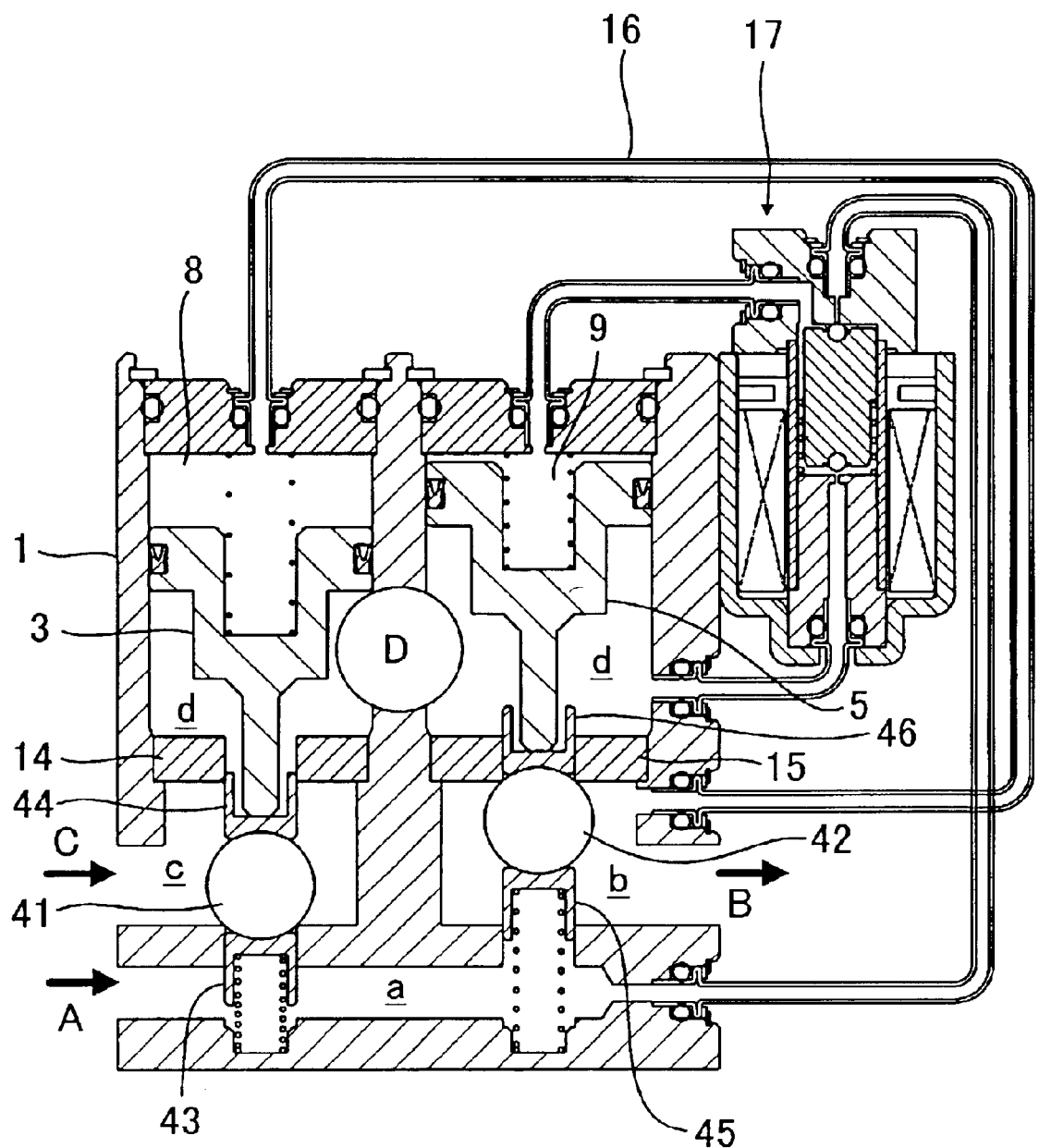
FIG. 12 is a longitudinal sectional view of a four-way switching valve according to a sixth embodiment of the invention, which shows the four-way switching valve in a solenoid-deenergized state.
Figure 13:
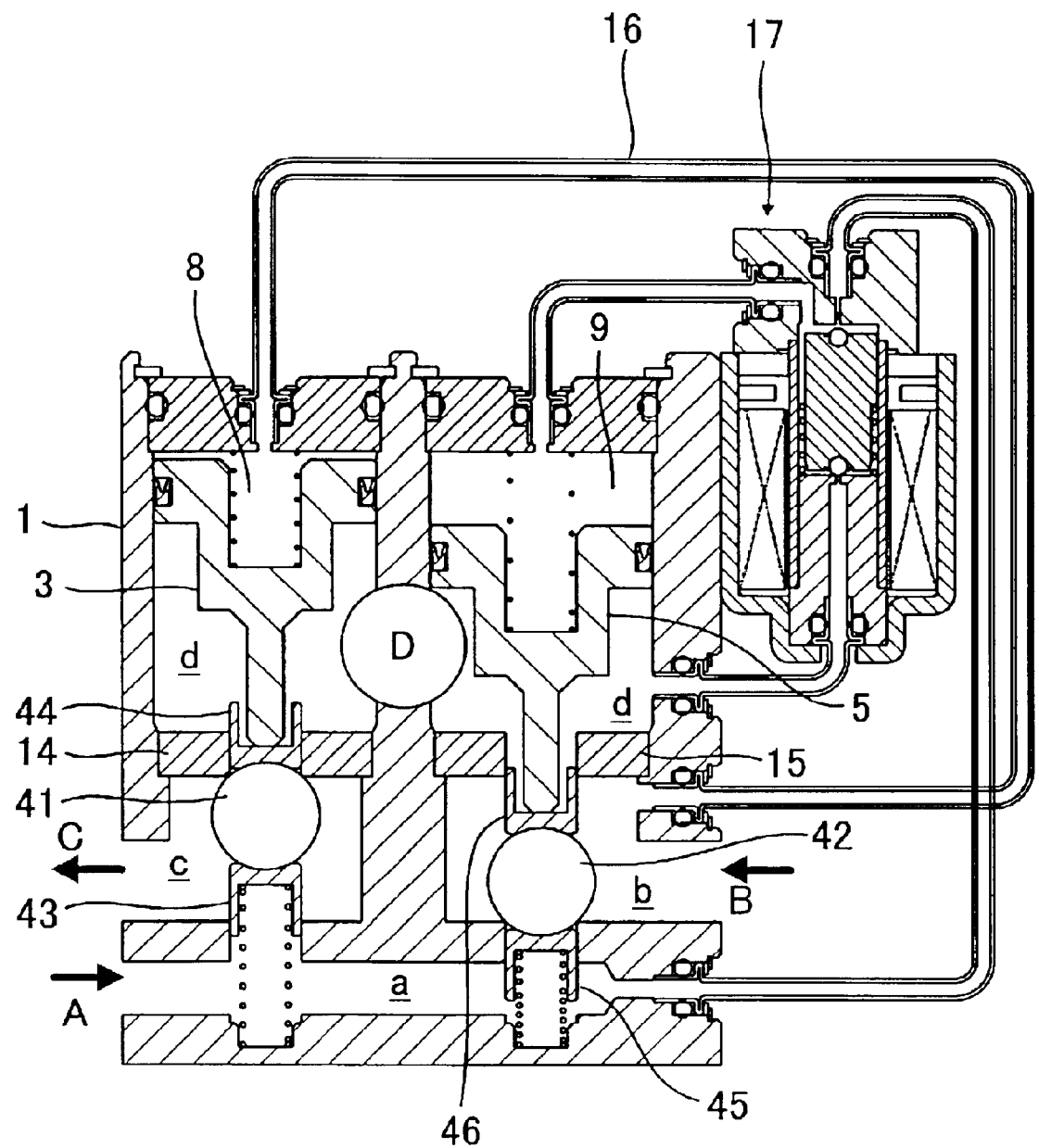
FIG. 13 is a longitudinal sectional view showing the four-way switching valve according to the sixth embodiment of the invention, which shows the four-way switching valve in a solenoid-energized state.

FIG. 12 is a longitudinal sectional view of a four-way switching valve according to a sixth embodiment of the invention, which shows the four-way switching valve in a solenoid-deenergized state. FIG. 13 is a longitudinal sectional view of the four-way switching valve according to the sixth embodiment of the invention, which shows the four-way switching valve in a solenoid-energized state. It should be noted that in FIGS. 12 and 13, component parts and elements similar or equivalent to those of the four-way switching valve shown in FIG. 1 are designated by identical reference numerals, and detailed description thereof is omitted.

The four-way switching valve according to the sixth embodiment employs balls 41 and 42 as valve elements in place of the plugs 2 and 4 of the four-way switching valve according to the first embodiment. The balls 41 and 42 have axial movements thereof guided on axially opposite sides by plugs 43 and 44, and plugs 45 and 46, respectively, all of which are arranged in a manner inserted into associated valve holes, respectively. The plugs 43 and 44, and plugs 45 and 46 each have a hollow cylindrical portion slidable on the inner wall of an associated one of the valve hole, and the hollow cylindrical portion is formed with an opening in the form of a hole or a slit. Thus, each of the valve holes is placed in a communicating state when an associated one of the balls 41 and 42 is moved in a direction away from one of the body 1 and the plugs 14 and 15 serving as its valve seat. By using the balls 41 and 42 as valve elements, the four-way switching valve can be easily applied to changeover of a refrigerant flow path between passages having a very large differential pressure, e.g. in a case where carbon dioxide is employed as the refrigerant. Moreover, since the balls 41 and 42 are supported in a state pressed from the axially opposite sides thereof, and can be slightly moved when seated on the valve seats, it is possible to automatically carry out alignment adjustment when the valve holes are closed, thereby enhancing the sealing performance.

In the four-way switching valve configured as above, in the solenoid-deenergized state, as shown in FIG. 12, the pressure-regulating chamber 9 communicates with the low-pressure chamber d by the three-way solenoid valve 17, so that the plug 45 is pressed and moved upward as viewed in the figures, to cause the ball 42 to be seated on the plug 15. This causes a high-pressure refrigerant to flow into the chamber b via the plug 45, and then flow into the pressure-regulating chamber 8 by way of the tube 16, so that the piston 3 is pressed and moved downward as viewed in the figure until the ball 41 closes the valve hole of the body 1. As a result, the port A communicates with the port B via the plug 45, and the port C communicates with the port D via the port 44, whereby the heating and cooling system for an automotive vehicle is switched to the cooling operation mode.

Next, in the solenoid-energized state, as shown in FIG. 13, the three-way solenoid valve 17 is switched to introduce the high pressure in the chamber a to the pressure-regulating chamber 9. This causes the piston 5 to be pressed and moved downward as viewed in the figures, whereby the ball 42 closes the associated valve hole of the body 1, and the pressure-regulating chamber 8 communicates with the low-pressure chamber d via the tube 16 and the plug 46. This causes the plug 43 to be pressed and moved upward as viewed in the figures, by the high-pressure refrigerant in the chamber a to seat the ball 41 on the plug 14. As a result, the port A communicates with the port C via the plug 43, and the port B communicates with the port D via the plug 46, so that the heating and cooling system for an automotive vehicle is switched to the heating operation mode.

Figure 14:
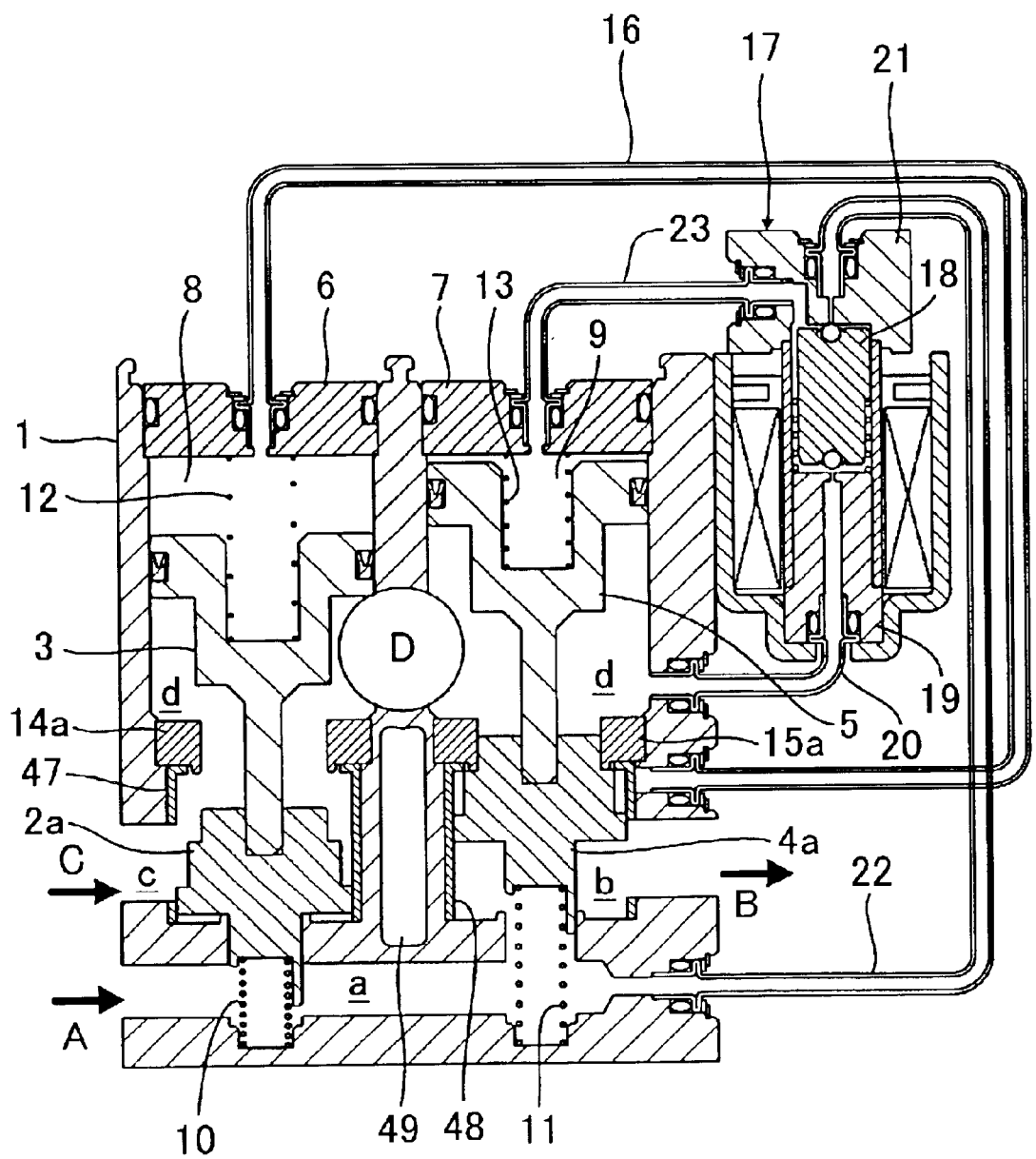
FIG. 14 is a longitudinal sectional view of a four-way switching valve according to a seventh embodiment of the invention, which shows the four-way switching valve in a solenoid-deenergized state.

FIG. 14 is a longitudinal sectional view of a four-way switching valve according to a seventh embodiment of the invention, which shows the four-way switching valve in a solenoid-deenergized state. It should be noted that in FIG. 14, component parts and elements similar or equivalent to those of the four-way switching valve shown in FIG. 1 are designated by identical reference numerals, and detailed description thereof is omitted.

The four-way switching valve according to the seventh embodiment is configured such that a passage through which flows a high-temperature and high-pressure refrigerant compressed by the compressor is thermally insulated from a passage through which flows a low-temperature and low-pressure refrigerant adiabatically expanded. More specifically, in the cooling operation mode, the chamber a communicating with the port A and the chamber b communicating with the port B are used as the passage through which the high-temperature and high-pressure refrigerant flows, while the chamber c communicating with the port C and the chamber d communicating with the port D are used as the passages through which the low-temperature and low-pressure refrigerant flows. The chambers a and b and the chambers c and d are arranged adjacent to each other within the body 1. In the case of the four-way switching valve applied to the heating and cooling system for an automotive vehicle, the body 1 is formed by using an aluminum material for weight reduction purpose. Since aluminum has a high thermal conductivity, the passage for the high-temperature refrigerant and the passage for the low-temperature refrigerant exchange heat with each other, via the body 1 separating them, resulting in a degraded operating efficiency of the refrigerating cycle.

To overcome the problem, in the four-way switching valve according to the seventh embodiment, plugs 2a and 4a each serving as the valve element and guide, and plugs 14a and 15a each serving as the valve seat therefor are formed by a material or materials having a lower thermal conductivity than that of the body 1. When the difference between the pressures of the refrigerant is not large, a resin is used as the material having a lower thermal conductivity, whereas when the difference is very large, a stainless steel, for instance, is suitable for the plugs.

Further, fitted in passages where the plugs 2a and 4a are arranged are sleeves 47 and 48, respectively, which have a lower thermal conductivity. The plugs 2a and 4a have large-diameter portions which have outer peripheries thereof in contact with the insides of the sleeves 47 and 48, respectively, such that the plugs 2a and 4a can be axially moved. As a result, in the case of the system being in the operation mode shown in the figure, when the high-temperature refrigerant passes through the chamber b, the sleeve 48 and the plug 4a prevent the refrigerant from flowing toward the plug 15a, and when the low-temperature refrigerant passes through the chamber c, the sleeve 47 and the plug 2a prevent the refrigerant from flowing toward a partition wall between the chambers a and c. The above construction is provided not for completely preventing the refrigerant from intruding toward the plug 15a and the partition wall between the chambers a and c, but for largely suppressing heat conduction to the plug 15a and the partition wall between the chambers a and c by blocking vortices generated by the refrigerant rapidly flowing through the chambers b and c, from flowing to the plug 15a and the partition wall between the chambers a and c.

As described hereinabove, the insides of the refrigerant passages through which the refrigerant flows in opposite directions depending on the operation mode i.e. the insides of the chambers b and c are surrounded by members having a lower thermal conductivity than that of the body 1, for thermal insulation of the chambers b and c. This makes it possible to eliminate heat exchange between chambers having different temperatures.

Further, when the system is in the operation mode shown in the figure, the high-temperature refrigerant flows though the chamber b, while the low-temperature refrigerant flows through the chamber c adjacent thereto, and therefore a thickness-reducing hole 49 is provided so as to reduce heat conduction through the partition wall between the chambers b and c.

In the four-way switching valve configured as above, in the solenoid-energized and solenoid-deenergized states, the same operations as carried out by the four-way switching valve according to the first embodiment are carried out.

Figure 15:
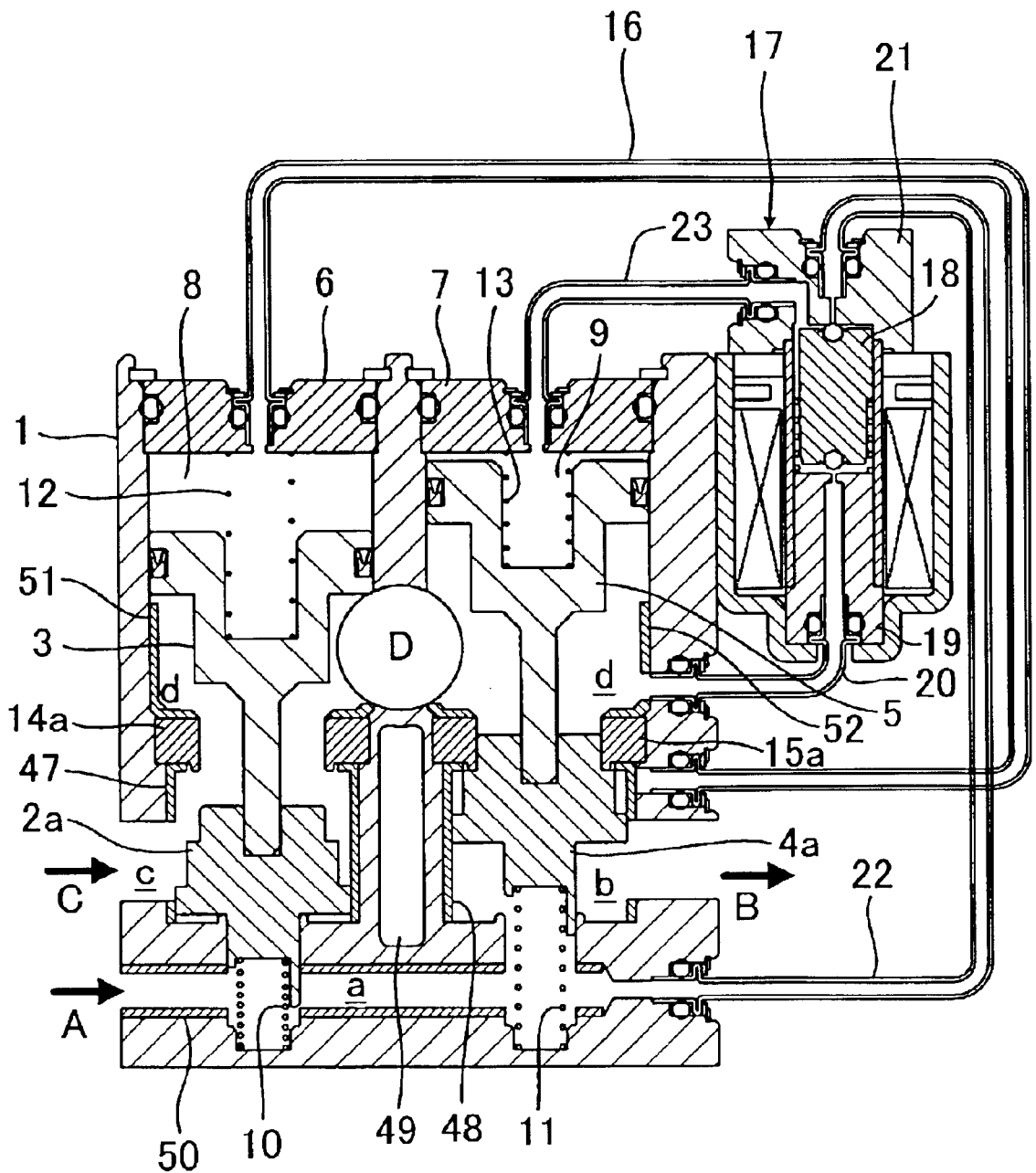
FIG. 15 is a longitudinal sectional view of a four-way switching valve according to an eighth embodiment of the invention, which shows the four-way switching valve in a solenoid-deenergized state.

FIG. 15 is a longitudinal sectional view of a four-way switching valve according to an eighth embodiment of the invention, which shows the four-way switching valve in a solenoid-deenergized state. It should be noted that in FIG. 15, component parts and elements similar or equivalent to those of the four-way switching valve shown in FIG. 14 are designated by identical reference numerals, and detailed description thereof is omitted.

The four-way switching valve according to the eighth embodiment is configured, in addition to the construction of the four-way switching valve according to the seventh embodiment, such that part of the chamber a into which the high-temperature and high-pressure refrigerant compressed by the compressor is introduced from the port A, and part of the chamber d from which the low-temperature and low-pressure refrigerant is discharged via the port D are provided with thermal barriers from inside. More specifically, the inner wall of the chamber a has a sleeve 50 having a lower thermal conductivity fitted therein, while in the chamber d, sleeves 51 and 52 having a lower thermal conductivity than that of the body 1 are fitted on portions of inner walls thereof at locations closer to the respective plugs 14a and 15a than the sliding ranges of the pistons 3 and 5, that is, on the high-temperature side inner walls of the chamber d.

This makes the heat of the high-temperature refrigerant introduced into the chamber a difficult to directly transfer to the body 1. Further, heat conduction to the body 1 is reduced, whereby the absolute quantity of heat transmitted to the low-temperature chamber d via the body 1 is reduced, and heat conduction from the body 1 is blocked by the sleeves 51 and 52 arranged on the high-temperature sides of the respective chamber d.

Figure 16:
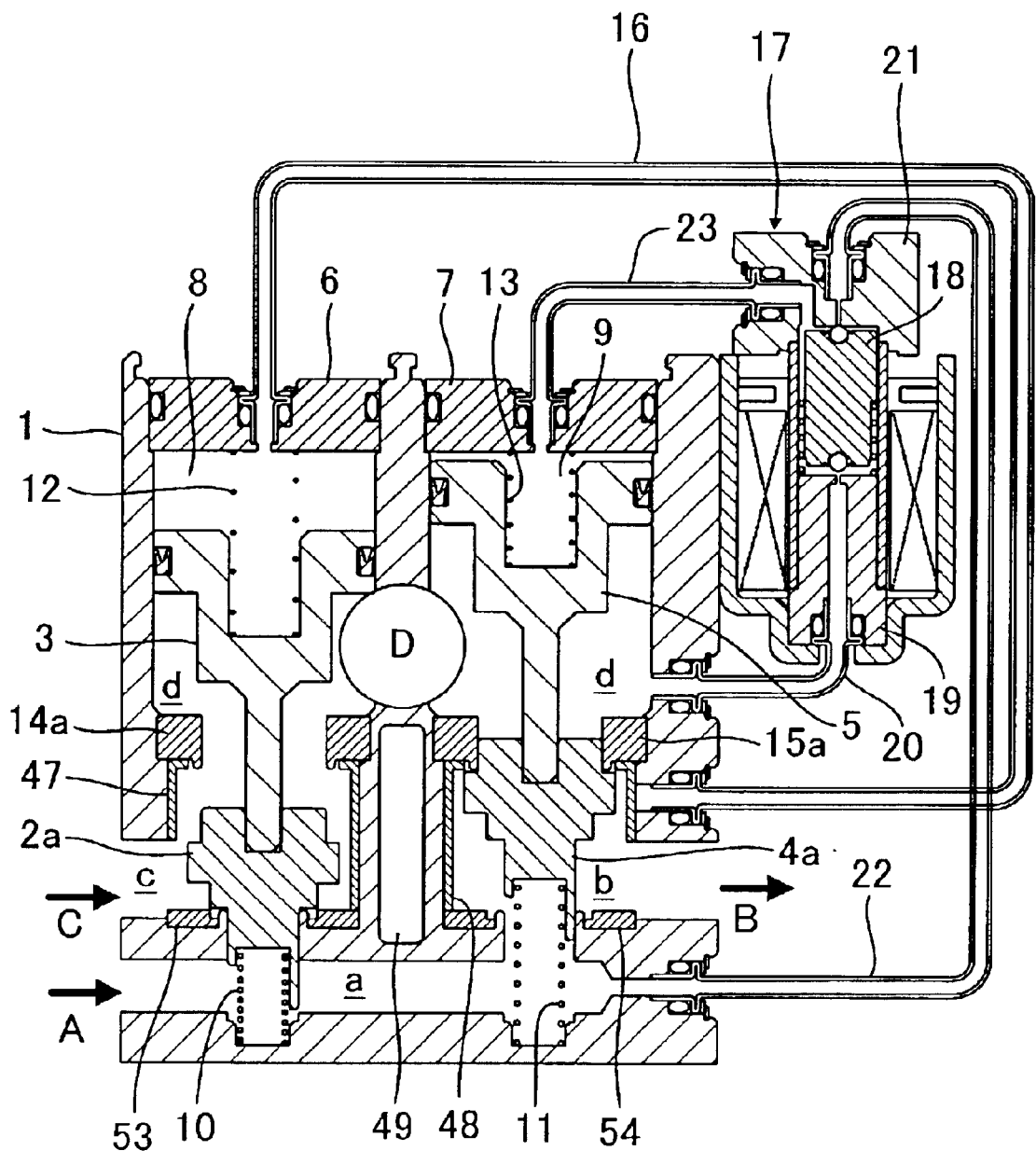
FIG. 16 is a longitudinal sectional view of a four-way switching valve according to a ninth embodiment of the invention, which shows the four-way switching valve in a solenoid-deenergized state.

FIG. 16 is a longitudinal sectional view of a four-way switching valve according to a ninth embodiment of the invention, which shows the four-way switching valve in a solenoid-deenergized state. It should be noted that in FIG. 16, component parts and elements similar or equivalent to those of the four-way switching valve shown in FIG. 14 are designated by identical reference numerals, and detailed description thereof is omitted.

The four-way switching valve according to the ninth embodiment has another configuration for thermally insulating a passage through which the high-temperature refrigerant flows and a passage through which the low-temperature refrigerant flows, from each other. In this four-way switching valve as well, the plugs 2a and 4a serving as valve elements, and the plugs 14a and 15a serving as valve seats for the valve elements are formed by a material or materials having a lower thermal conductivity than that of the body 1. In the chambers c and b, discs 53 and 54 having a lower thermal conductivity are arranged around annular projections integrally formed with the body 1 for valve holes communicating with the chamber a, so as to prevent heat conduction between the chambers b and c, and the chamber a. Further, the passages having the plugs 2a and 4a arranged therein are provided with the sleeves 47 and 48 having a lower thermal conductivity to prevent heat conduction between the body 1 and the chambers b and c.

As a result, in the case of the system being in the operation mode shown in the figure, when the high-temperature refrigerant passes through the chamber b, the sleeve 48 and the plugs 4a and 15a inhibit heat conduction to the chamber d, and the disc 53 and the plug 2a prevent heat conduction from the chamber a to the low-temperature refrigerant passing through the chamber c.

Also in the four-way switching valve configured as above, in the solenoid-energized and solenoid-deenergized states, the same operations as carried out by the four-way switching valve according to the seventh embodiment are carried out.

Figure 17:
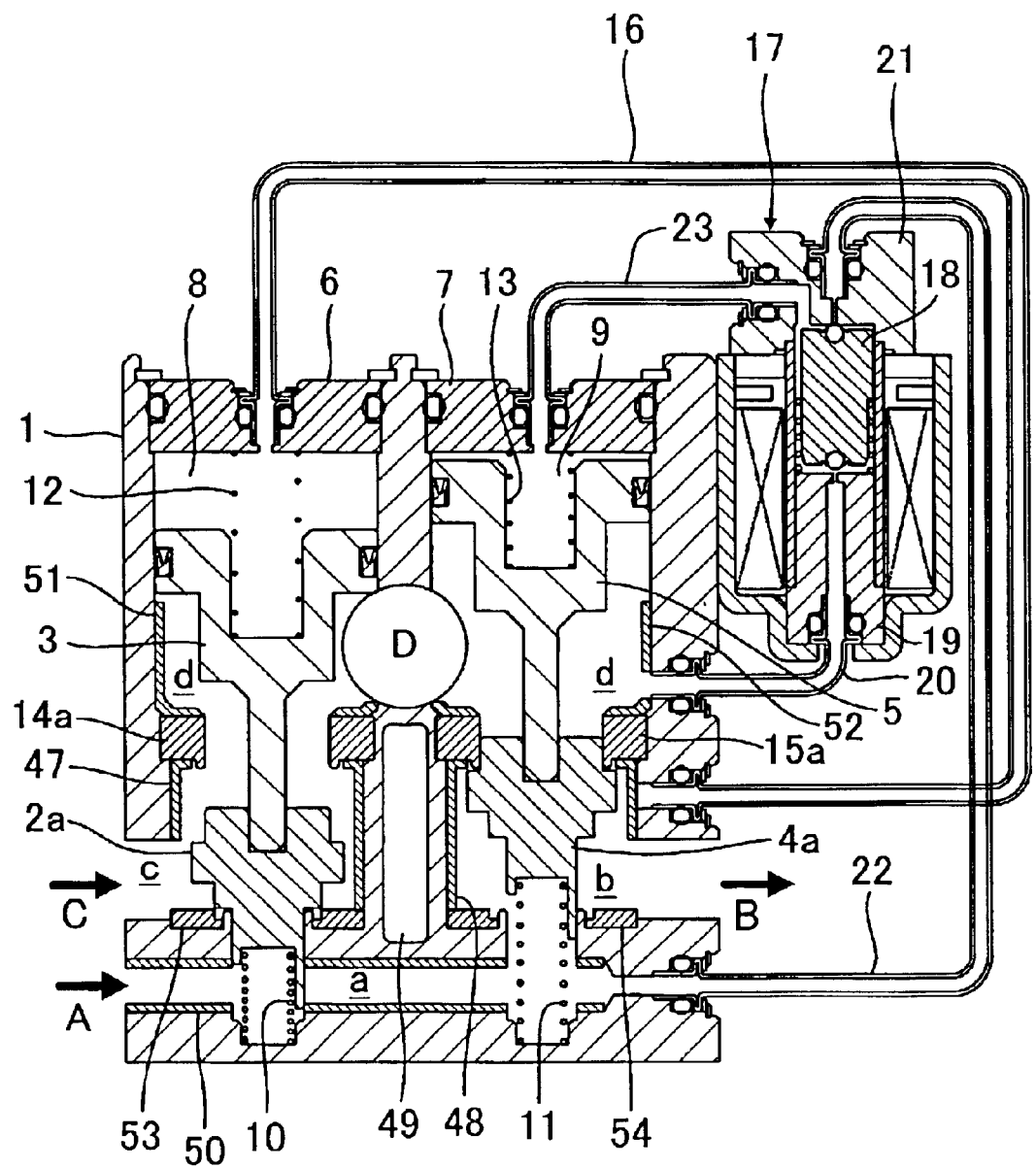
FIG. 17 is a longitudinal sectional view of a four-way switching valve according to a tenth embodiment of the invention, which shows the four-way switching valve in a solenoid-deenergized state.
Figure 18:
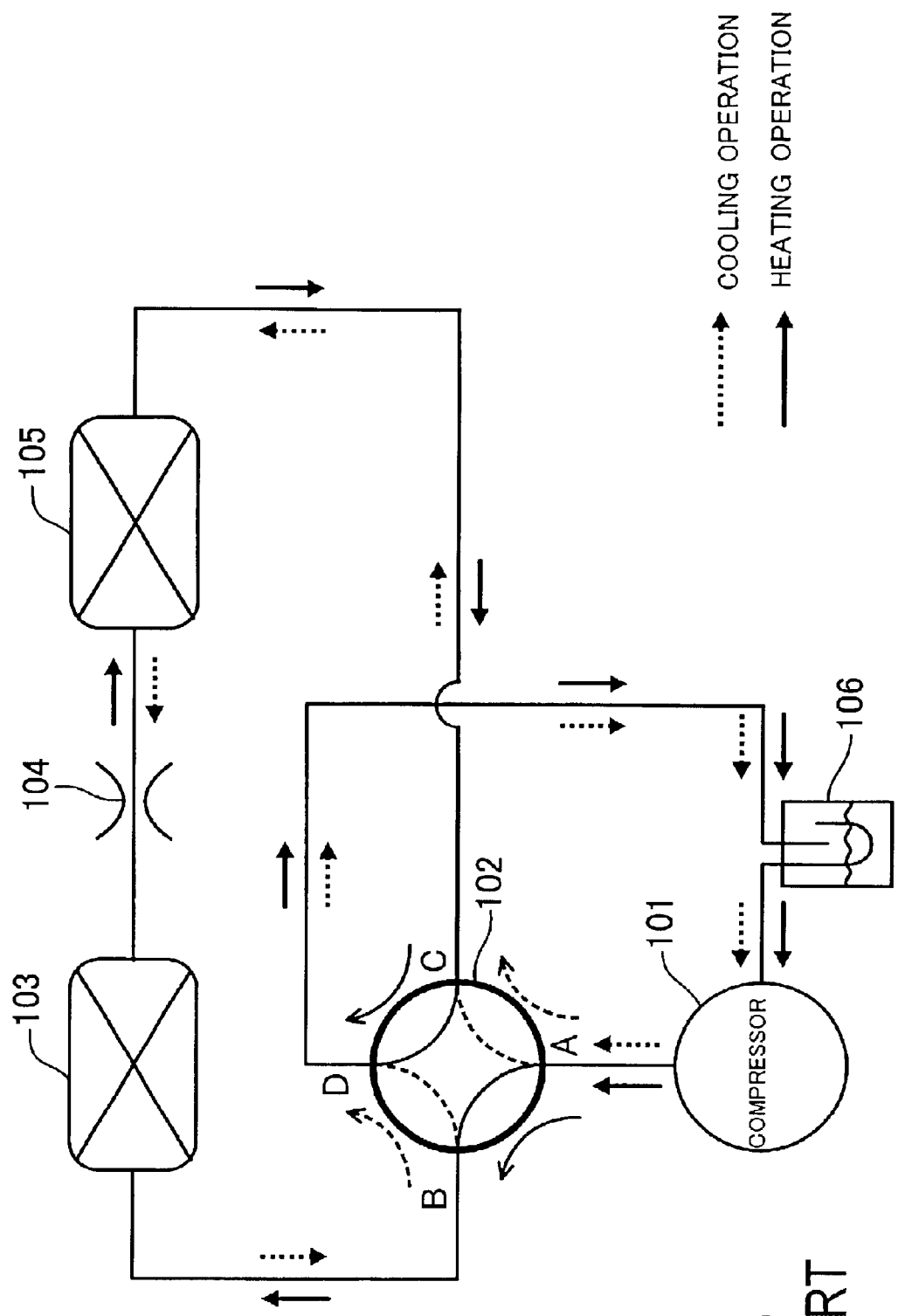
FIG. 18 is a block diagram showing the arrangement of a heating and cooling system to which is applied the four-way switching valve.

FIG. 17 is a longitudinal sectional view of a four-way switching valve according to a tenth embodiment of the invention, which shows the four-way switching valve in a solenoid-deenergized state. It should be noted that in FIG. 17, component parts and elements similar or equivalent to those of the four-way switching valve shown in FIG. 16 are designated by identical reference numerals, and detailed description thereof is omitted.

The four-way switching valve according to the tenth embodiment is configured, in addition to the construction of the four-way switching valve according to the ninth embodiment, such that part of the chamber a into which the high-temperature and high-pressure refrigerant compressed by the compressor is introduced from the port A, and part of the chamber d from which the low-temperature and low-pressure refrigerant is discharged via the port D are provided with thermal barriers from inside. More specifically, the inner wall of the chamber a has a sleeve 50 having a lower thermal conductivity fitted therein, while in the chamber d, sleeves 51 and 52 having a lower thermal conductivity than that of the body 1 are fitted on portions thereof closer to the respective plugs 14a and 15a than the sliding ranges of the pistons 3 and 5, that is, on the high-temperature side inner walls of the chamber d.

This makes the heat of the high-temperature refrigerant introduced into the chamber a difficult to directly transfer to the body 1. Further, due to reduction of heat conduction to the body 1, the absolute quantity of heat transmitted to the low-temperature chamber d via the body 1 is reduced, and heat conduction from the body 1 is blocked by the sleeves 51 and 52 arranged on the high-temperature sides of the respective chambers d.

As described heretofore, the four-way switching valve according to the invention is comprised of two three-way switching valves arranged side by side, each of which has a pressure-regulating chamber, a piston, and a plug forming a valve element, coaxially arranged. One of the pressure-regulating chambers selectively communicates with a low-pressure chamber or a high-pressure chamber by a three-way solenoid valve, and the other of the pressure-regulating chambers communicates with a chamber pressure within which is increased or reduced as pressure within the one of the pressure-regulating chambers is decreased or increased. As a result, when the pressure within one of the pressure-regulating chambers is decreased or increased, that within the other of the pressure-regulating chambers can be increased or decreased, so that it is possible to prevent leakage of the refrigerant by separating the pressure-regulating chambers from the low-pressure chamber by using sealing members. This makes it possible to prevent degradation of refrigerating power of the system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A four-way switching valve for switching between a first state in which a fluid introduced into a first port is discharged to a second port and the fluid introduced into a third port is discharged to a fourth port, and a second state in which the fluid introduced into the first port is discharged to the third port and the fluid introduced into the second port is discharged to the fourth port, the four-way switching valve comprising a combination of:

a first three-way switching valve for carrying out a switching operation to cause the second port to communicate with the first port or the fourth port; and a second three-way switching valve for carrying out a switching operation to cause the third port to communicate with the fourth port or the first port;

wherein the first three-way switching valve includes a first valve element for opening and closing respective passages formed between the second port and the first port and between the second port and the fourth port, and a first piston for driving the first valve element in a direction in which the passage formed between the second port and the first port is closed, and wherein the second three-way switching valve includes a second valve element for opening and closing respective passages formed between the third port and the first port and between the third port and the fourth port, and a second piston for driving the second valve element in a direction in which the passage formed between the third port and the first port is closed; and wherein the four-way switching valve further includes passage-switching means for selectively connecting a pressure-regulating chamber for the first piston to a chamber communicating with the fourth port or a chamber communicating with the first port; communication means for causing a pressure-regulating chamber for the second piston and a chamber communicating with the second port to communicate with each other; first and second guides which are slidably inserted into the respective passages formed between the second port and the first port and between the second port and the fourth port, for guiding the first valve element, and simultaneously close both of these passages at respective intermediate positions of the first three-way switching valve and the second three-way switching valve during switching operations thereof; and third and fourth guides which are slidably inserted into the respective passages formed between the third port and the first port and between the third port and the fourth port, for guiding the second valve element, and simultaneously closing both of these passages at the intermediate positions of the first three-way switching valve and the second three-way switching valve during the switching operations thereof, the first port and the fourth port being prevented from communicating with each other during the switching operations of the first three-way switching valve and the second three-way switching valve.

2. The four-way switching valve according to claim 1, wherein the passage-switching means is a three-way solenoid valve.

3. The four-way switching valve according to claim 1, wherein the first piston and the second piston are arranged between the pressure-regulating chambers therefor and the chamber communicating with the fourth port, respectively.

4. The four-way switching valve according to claim 3, wherein the first piston and the second piston have sealing members provided therefor, respectively, for separating the chamber communicating with the fourth port from the pressure-regulating chambers therefor.

5. The four-way switching valve according to claim 1, wherein the first valve element and the second valve element are urged by the fluid introduced into the first port in a direction in which the passages formed between the second port and the first port and between the third port and first ports are opened.

6. The four-way switching valve according to claim 1, wherein the first and second guides are integrally formed with the first valve element, and the third and fourth guides are integrally formed with the second valve element.

7. A four-way switching valve for switching between a first state in which a fluid introduced into a first port is discharged to a second port and the fluid introduced into a third port is discharged to a fourth port, and a second state in which the fluid introduced into the first port is discharged to the third port and the fluid introduced into the second port is discharged to the fourth port, the four-way switching valve comprising:

a first plug axially movably arranged in a second chamber which is located between a first chamber communicating with the first port and a fourth chamber communicating with the fourth port, and communicates with the second port, the first plug having, on axially opposite sides thereof, valve element functions for opening and closing valve holes communicating with the first chamber and the fourth chamber, respectively;

a first piston axially movably arranged in a manner dividing between the fourth chamber and a first pressure-regulating chamber, for cooperation with the first plug; a second plug axially movably arranged in a third chamber which is located between the first chamber communicating with the first port and the fourth chamber communicating with the fourth port, and communicates with the third port, the second plug having, on axially opposite sides thereof, valve element functions for opening and closing valve holes communicating with the first chamber and the fourth chamber, respectively;

a second piston axially movably arranged in a manner dividing between the fourth chamber and a second pressure-regulating chamber, for cooperation with the second plug; a tube for communicating between the second chamber and the second pressure-regulating chamber;

a three-way solenoid valve for causing the first pressure-regulating chamber to selectively communicate with the first chamber or the fourth chamber; and guides which are arranged on axially opposite sides of the first plug and the second plug, and slidably inserted into the valve holes communicating with the first chamber and the fourth chamber, respectively, for guiding the first plug and the second plug, the guides each formed to have a length for simultaneously closing both of the passages at intermediate positions thereof during switching operation by the three-way solenoid valve, the first port and the fourth port being prevented from communicating with each other during the switching operation by the three-way solenoid valve.

8. The four-way switching valve according to claim 7, wherein the first piston and the second piston have sealing members provided therefor, for separating the fourth chamber from the first pressure-regulating chamber and the second pressure-regulating chamber.

* * * * *